United States Patent
Hama et al.

(10) Patent No.: US 7,680,425 B2
(45) Date of Patent: Mar. 16, 2010

(54) IMAGE FORMING APPARATUS AND METHOD FOR CONTROLLING TONE CHARACTERISTICS BASED ON TONE-CONTROL PATCH IMAGE

(75) Inventors: Takashi Hama, Nagano-ken (JP); Hidetsugu Shimura, Nagano-ken (JP); Keiichi Taguchi, Nagano-ken (JP); Hiroshi Nakazato, Nagano-ken (JP); Ken Ikuma, Nagano-ken (JP); Hidenori Kin, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1619 days.

(21) Appl. No.: 10/893,743

(22) Filed: Jul. 16, 2004

(65) Prior Publication Data
US 2005/0030562 A1 Feb. 10, 2005

(30) Foreign Application Priority Data

| Jul. 18, 2003 | (JP) | 2003-198921 |
| Jul. 30, 2003 | (JP) | 2003-203517 |
| Jul. 30, 2003 | (JP) | 2003-203518 |
| Aug. 8, 2003 | (JP) | 2003-290709 |
| Apr. 30, 2004 | (JP) | 2004-135480 |

(51) Int. Cl.
G03G 15/00 (2006.01)
(52) U.S. Cl. ...................................................... 399/49
(58) Field of Classification Search .................... 399/49
See application file for complete search history.

(56) References Cited

U.S. PATENT DOCUMENTS

| 5,579,090 A * | 11/1996 | Sasanuma et al. ............. 399/49 |
| 5,812,903 A | 9/1998 | Yamada et al. |
| 6,185,386 B1 | 2/2001 | Noguchi |
| 6,324,375 B1 | 11/2001 | Hada et al. |
| 6,341,203 B1 | 1/2002 | Nakazato et al. |
| 6,415,114 B1 | 7/2002 | Nakazato et al. |
| 6,427,062 B1 * | 7/2002 | Takeuchi ..................... 399/388 |
| 6,597,878 B2 | 7/2003 | Nakazato et al. |
| 6,775,489 B2 * | 8/2004 | Tsuruya et al. ............... 399/49 |

(Continued)

FOREIGN PATENT DOCUMENTS

JP 61209470 A 9/1986

(Continued)

Primary Examiner—David M Gray
Assistant Examiner—Andrew V Do
(74) Attorney, Agent, or Firm—Hogan & Hartson LLP

(57) ABSTRACT

An image It is formed as a patch image which includes a header image portion Ih of a solid image having a length of a circumferential length of a developing roller or more, and a gradation image portion Ig progressively varied in the tone level thereof from the maximum level to the minimum level. The densities of the patch image on an intermediate transfer belt are sampled. However, the sampling results contain errors resulting from noises or variations and hence, are subjected to a noise removal process, a periodical variation correction process and a reverse correction process. The results detected on the intermediate transfer belt do not always coincide with image densities (OD values) on a recording material. Therefore, the detection results are converted into the OD values, based on which tone characteristics of an apparatus is estimated. Then a tone correction table is updated in a manner to compensate for the tone characteristics. This approach is taken to improve image quality on the recording material.

5 Claims, 28 Drawing Sheets

U.S. PATENT DOCUMENTS

| | | |
|---|---|---|
| 6,909,858 B2 * | 6/2005 | Hama et al. .................... 399/49 |
| 7,013,093 B2 | 3/2006 | Nakazato |
| 7,149,439 B2 | 12/2006 | Hirata et al. |
| 7,269,362 B2 | 9/2007 | Hama et al. |
| 2002/0041770 A1 | 4/2002 | Nakazato et al. |
| 2004/0081476 A1 * | 4/2004 | Hama .......................... 399/49 |
| 2005/0185973 A1 | 8/2005 | Hama et al. |

FOREIGN PATENT DOCUMENTS

| | | | |
|---|---|---|---|
| JP | 05-257353 | | 10/1993 |
| JP | 05333652 | A | 12/1993 |
| JP | 06027776 | A | 2/1994 |
| JP | 06175452 | A * | 6/1994 |
| JP | 06-250480 | | 9/1994 |
| JP | 2729976 | | 9/1994 |
| JP | 07-020669 | | 1/1995 |
| JP | 07-131649 | | 5/1995 |
| JP | 08-230234 | | 9/1996 |
| JP | 2729976 | B | 12/1997 |
| JP | 10-198088 | | 7/1998 |
| JP | 10-278347 | | 10/1998 |
| JP | 10293432 | A | 11/1998 |
| JP | 10319669 | A | 12/1998 |
| JP | 11184181 | A | 7/1999 |
| JP | 11249374 | A | 9/1999 |
| JP | 11265132 | A | 9/1999 |
| JP | 3098138 | | 8/2000 |
| JP | 2000-333012 | | 11/2000 |
| JP | 2001075319 | A | 3/2001 |
| JP | 2001194840 | A | 7/2001 |
| JP | 2001-290320 | | 10/2001 |
| JP | 2001-337507 | | 12/2001 |
| JP | 2002040726 | A | 2/2002 |
| JP | 2002-116614 | | 4/2002 |
| JP | 2002174929 | A | 6/2002 |
| JP | 2002196636 | A | 7/2002 |
| JP | 2002-218245 | | 8/2002 |
| JP | 2002236399 | A | 8/2002 |
| JP | 2002278249 | A | 9/2002 |
| JP | 2003121356 | A | 4/2003 |
| JP | 2003-189104 | | 7/2003 |
| JP | 3473304 | | 9/2003 |
| JP | 3473304 | B | 9/2003 |
| JP | 2004354666 | A | 12/2004 |

* cited by examiner

F I G. 1 0
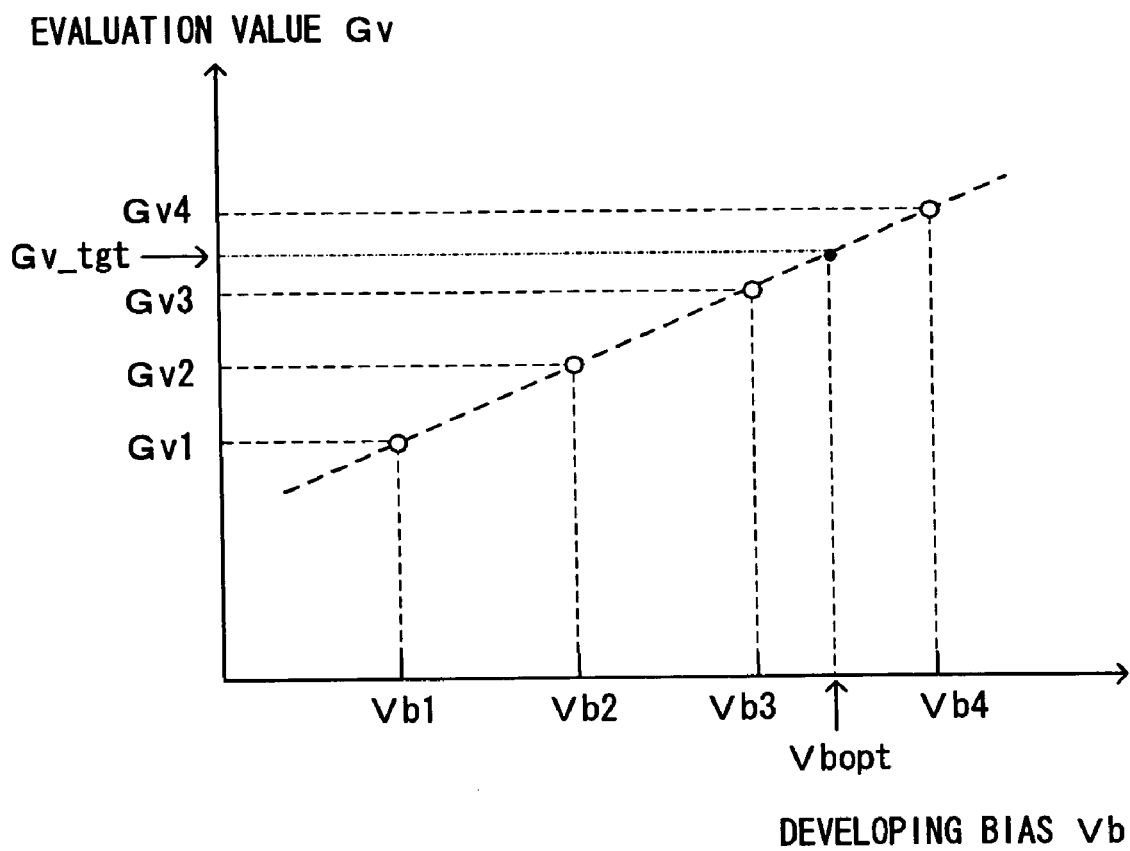

F I G. 1 4
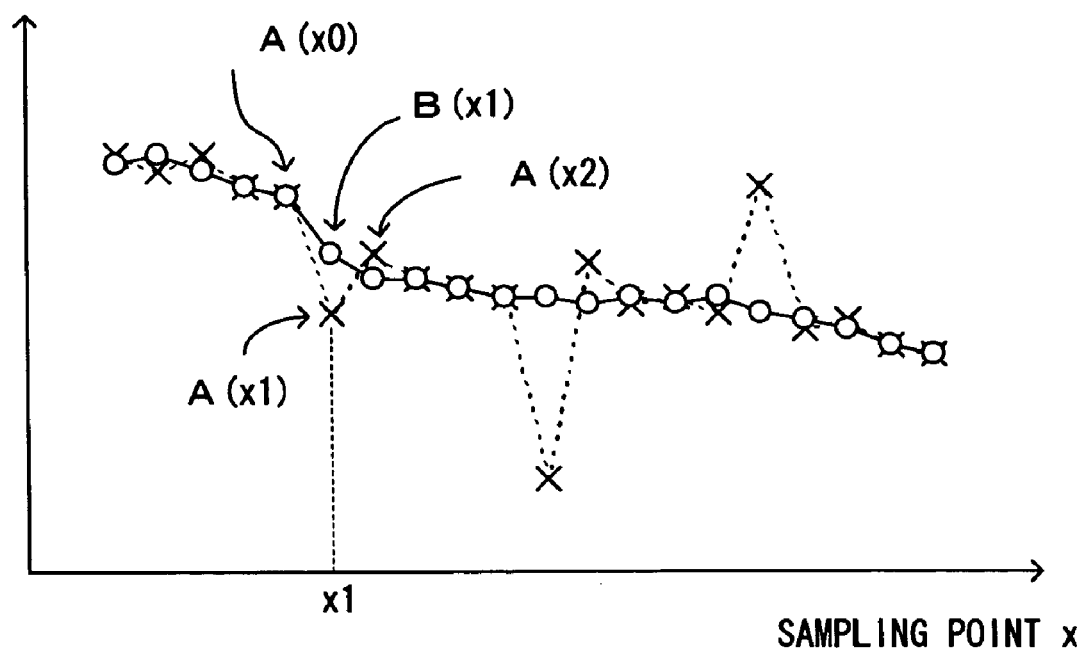

F I G. 2 6
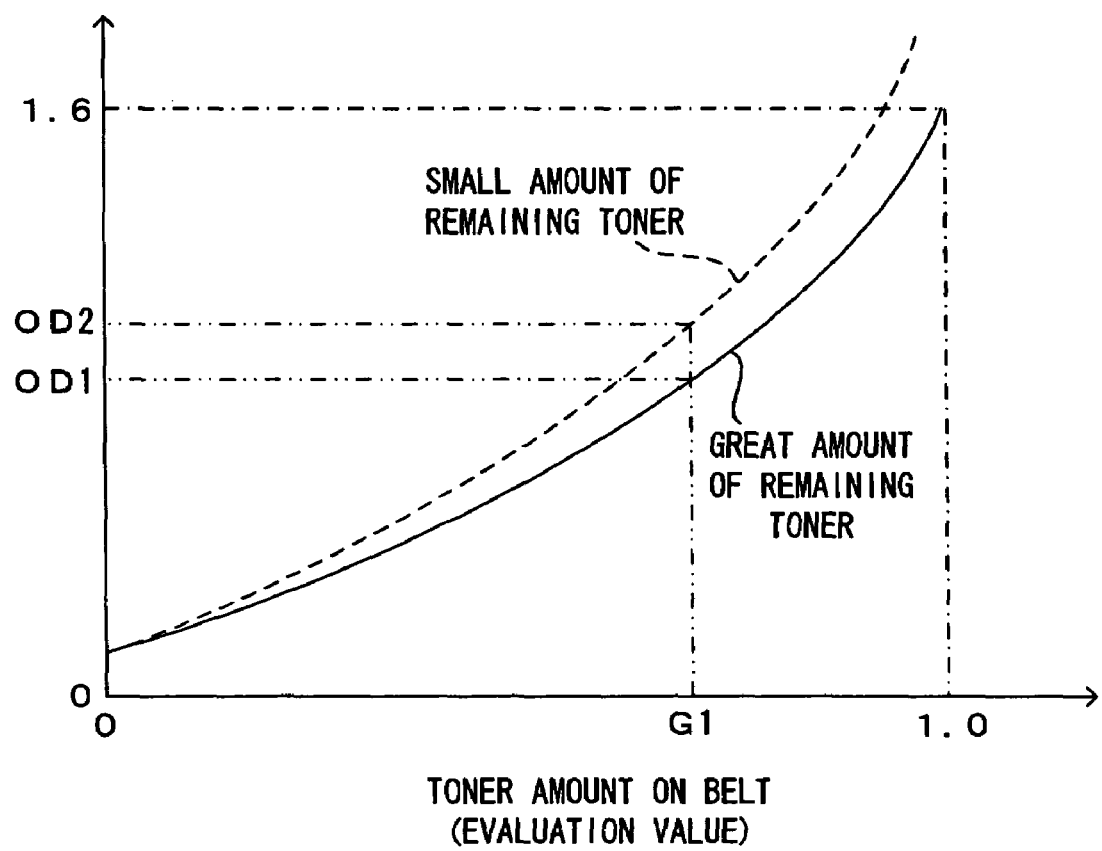

IMAGE FORMING APPARATUS AND METHOD FOR CONTROLLING TONE CHARACTERISTICS BASED ON TONE-CONTROL PATCH IMAGE

CROSS REFERENCE TO RELATED APPLICATION

The disclosure of Japanese Patent Applications enumerated below including specification, drawings and claims is incorporated herein by reference in its entirely:

No. 2003-198921 filed Jul. 18, 2003;
No. 2003-203517 filed Jul. 30, 2003;
No. 2003-203518 filed Jul. 30, 2003;
No. 2003-290709 filed Aug. 8, 2003; and
No. 2004-135480 filed Apr. 30, 2004.

BACKGROUND OF THE INVENTION

1. Field of the Invention

The present invention relates to an image forming apparatus adapted to control the image forming conditions thereof based on the detected density of a toner image as a patch image, a control method for the same and an image forming method.

2. Description of the Related Art

Electrophotographic image forming apparatuses such as printers, copiers and facsimiles adopt the following method to ensure that a predetermined level of image quality is achieved in a consistent manner. Specifically, a small test image (patch image) having a predetermined image pattern is formed as required, while an image density of the image is detected by means of a density sensor. Then, operating conditions of individual parts of the apparatus are controlled based on the detection result.

In an image forming apparatus disclosed in Japanese Patent Application Laid-Open Gazette No. 2000-333012, for example, tone correction characteristics of the apparatus are controlled based on the detected density of the patch image. Specifically, the apparatus detects a density of the test image of the predetermined pattern by means of a patch sensor. Gamma characteristics of the apparatus are grasped from the detection results so as to generate a corrective conversion table for tone correction. Referring to the new corrective conversion table thus generated, the apparatus converts an image signal into data indicative of a laser pulse width. As a result, there may be obtained an optimum print result corresponding to the variations of the gamma characteristics of the apparatus.

According to the common tone correction technique of this type, the patch images are formed only at some typical tone levels. The gamma characteristics of the apparatus are estimated from the detected densities of such path images so as to determine the tone correction characteristics of the apparatus. More recently, however, there is an increasing demand for higher image quality, which dictates the need to establish a tone correction technique providing a more exact and more accurate tone correction.

SUMMARY OF THE INVENTION

The invention is directed to the increased accuracies of the tone correction technique. For achieving the object, a first aspect of the invention proposes a mode to form a preferred patch image for improving the accuracies of the tone correction technique. According to the invention, the tone correction characteristics of the apparatus are controlled based on the detected density of a patch image, which includes a gradation image portion and a header image portion. The gradation image portion comprises an image progressively varied in the tone level thereof. The gradation image portion is used for detecting an image density at each of the tone levels. The header image portion is formed as an even image in order to serve the purpose of improving the accuracies of the density detection at each of the tone levels. For the purpose of suppressing the density variations of the gradation image portion, on the other hand, the header image portion is formed prior to the formation of the gradation image portion in a manner to consume a toner remaining on a toner carrier so that the gradation image portion may be formed with a fresh toner.

For achieving the above object, a second aspect of the invention proposes a preferred processing technique for improving the accuracies of the tone correction technique. Specifically, the invention is arranged to reduce the influences of noises and detection errors by performing appropriate correction processes on the detected density of the patch image. In a first correction process, the influences of periodical density variations associated with the construction of the apparatus are cancelled by performing a smoothing process on the detection results. On the other hand, in a case where the patch image has a different tendency of density variations from a previously estimated tendency of the density variations thereof, a second correction process is performed to correct the tendency. A third correction process is provided in view of a fact that the amount of toner as detected on an intermediate image carrier does not always coincide with a final image density on a recording material. The correction process converts the amount of toner into a value indicative of the image density on the recording material, such that the converted value may be used for the control of the tone correction characteristics of the apparatus.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIG. 10 is a graph explanatory of the principles of a calculation method for optimum developing bias;

FIG. 14 is a graph explanatory of a process for spike-like noise correction;

FIG. 26 is a graph representing an example of the transferring/fixing characteristics;

DETAILED DESCRIPTION OF THE PREFERRED EMBODIMENTS

Figure 1:
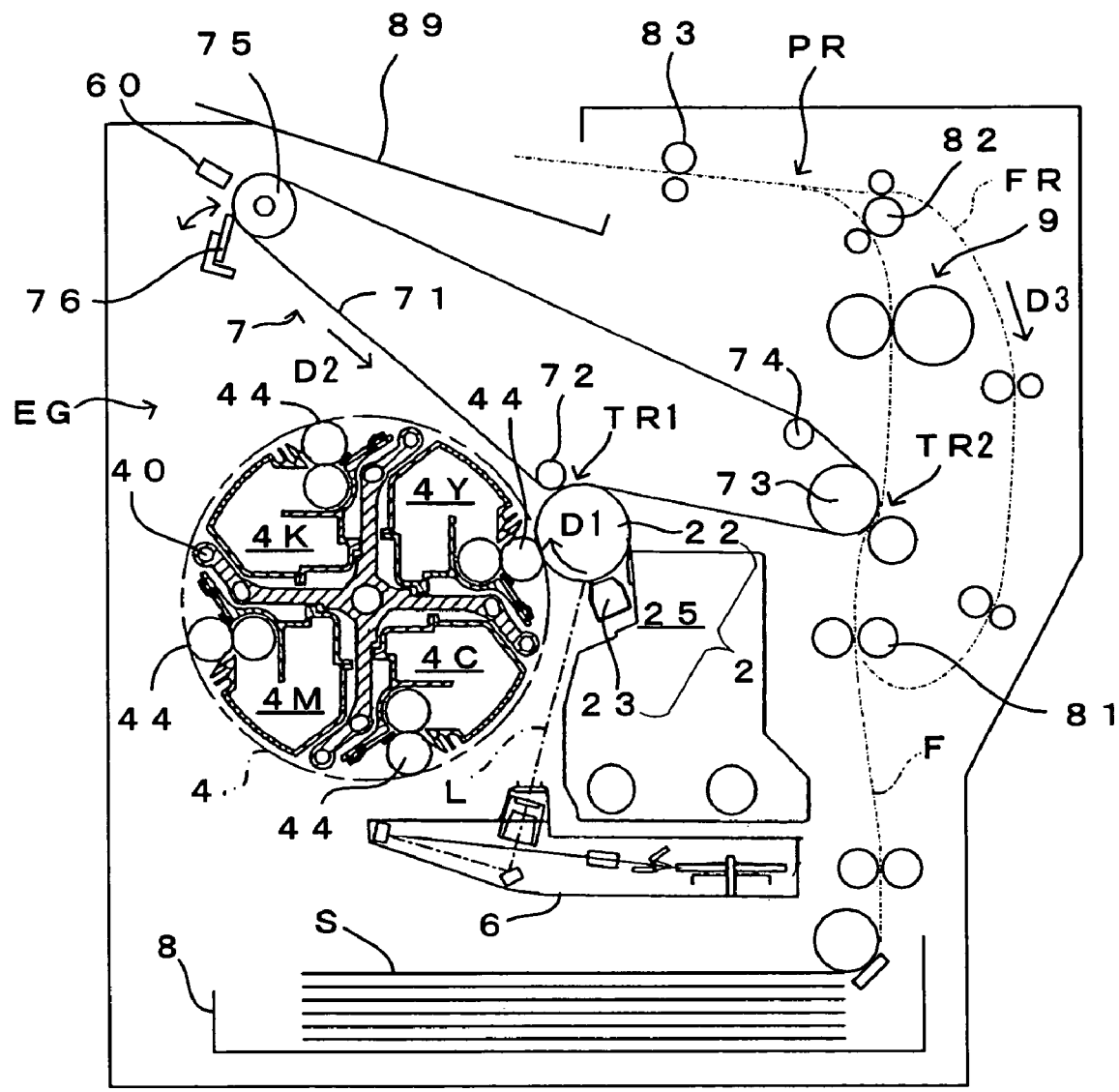
FIG. 1 is a diagram showing an image forming apparatus according to one embodiment of the invention.
Figure 2:
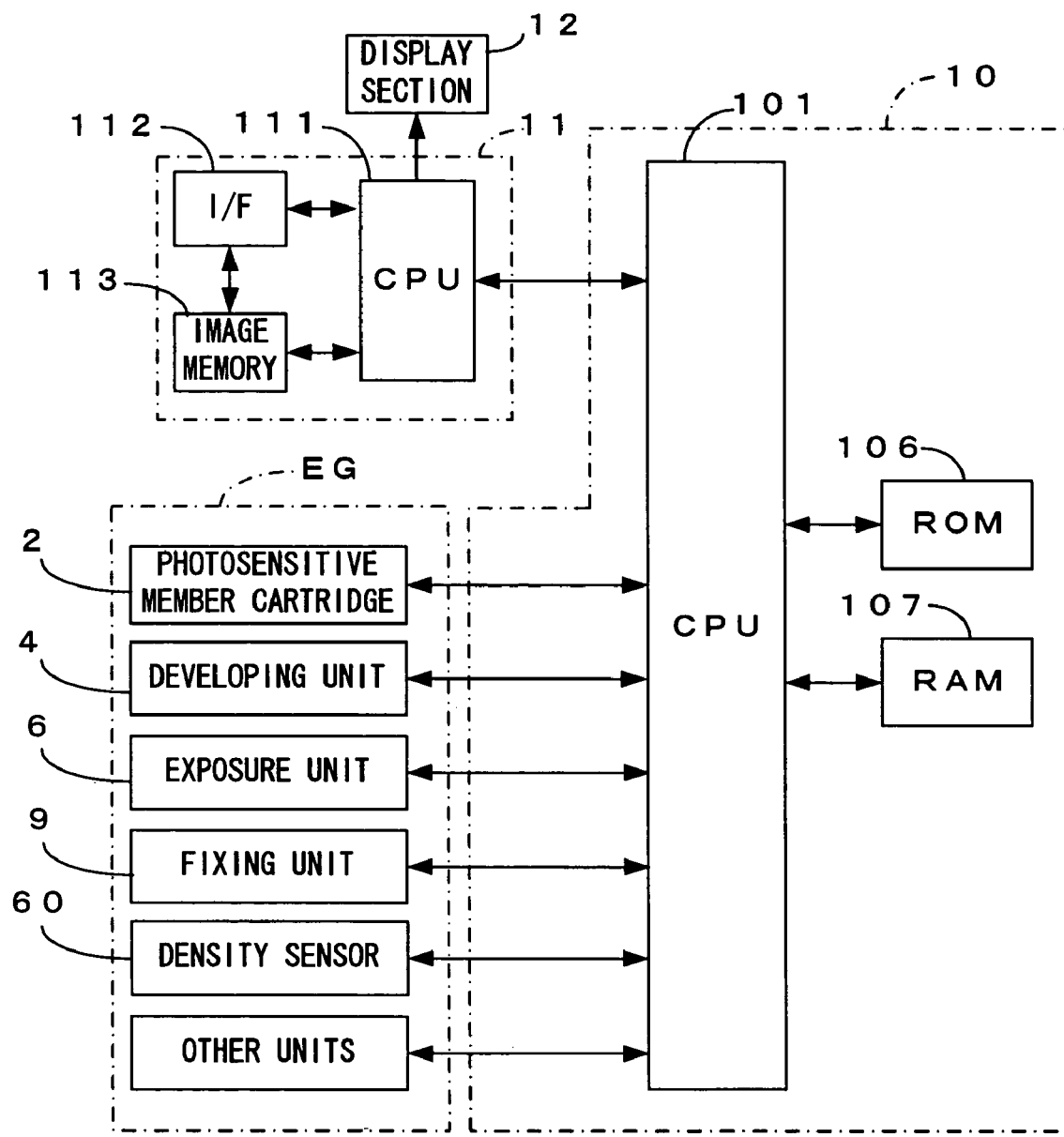
FIG. 2 is a block diagram showing an electrical arrangement of the image forming apparatus of FIG. 1.

FIG. 1 is a diagram showing an image forming apparatus according to one embodiment of the invention. FIG. 2 is a block diagram showing an electrical arrangement of the image forming apparatus of FIG. 1. The apparatus forms a full color image by superimposing toners of four colors including yellow (Y), cyan (C), magenta (M) and black (K), or forms a monochromatic image using the black (K) toner alone. The image forming apparatus operates as follows. When an external apparatus such as a host computer applies an image signal to a main controller 11, the main controller 11 outputs a command, based on which a CPU 101 of an engine controller 10 controls individual parts of an engine EG for carrying out predetermined image forming operations. Thus, an image corresponding to the image signal is formed on a sheet S.

The engine EG is provided with a photosensitive member 22 rotatable along a direction of an arrow D1 as seen in FIG. 1. A charger unit 23, a rotary developing unit 4 and a cleaner 25 are arranged around the photosensitive member 22 along the rotational direction D1 thereof. The charger unit 23 is applied with a predetermined charging bias so as to uniformly charge an outer periphery of the photosensitive member 22 to a predetermined surface potential. The cleaner 25 removes the toners remaining on the surface of the photosensitive member 22 after primary image transfer and collects the removed toners in a waste toner tank incorporated therein. The photosensitive member 22, the charger unit 23 and the cleaner 25 are integrated into a photosensitive member cartridge 2. The photosensitive member cartridge 2 is designed to be bodily mounted to or dismounted from a main body of the apparatus.

An exposure unit 6 irradiates a light beam L onto the outer periphery of the photosensitive member 22 charged by the charger unit 23. The exposure unit 6 irradiates the light beam L on the photosensitive member 22 according to the image signal applied from the external apparatus, so as to form an electrostatic latent image corresponding to the image signal.

The electrostatic latent image thus formed is developed with the toner by means of the developing unit 4. According to the embodiment, the developing unit 4 includes: a support frame 40 adapted to rotate about a rotary axis perpendicular to the drawing surface of FIG. 1; and a yellow developer 4Y, a cyan developer 4C, a magenta developer 4M and a black developer 4K which are each designed as a cartridge to be removably mounted to the support frame 40 and which each contain therein a toner of a color individual thereto. The developing unit 4 is controlled by the engine controller 10. The developer unit 4 is driven into rotations based on a control instruction from the engine controller 10. When the developers 4Y, 4C, 4M and 4K are selectively positioned at a predetermined developing position which abuts on the photosensitive member 22 or is away a predetermined gap from the photosensitive member 22, toner of the color corresponding to the selected developer is supplied onto the surface of the photosensitive member 22 from a developer roller 44 disposed to the selected developer which carries toner of this color and has been applied with the predetermined developing bias. As a result, the electrostatic latent image on the photosensitive member 22 is visualized in the selected toner color.

The toner image thus developed by the developing unit 4 is primarily transferred onto an intermediate transfer belt 71 of a transfer unit 7 in a primary transfer region TR1. The transfer unit 7 includes the intermediate transfer belt 71 entrained about a plurality of rollers 72-75, and a driver (not shown) operative to drive the roller 73 into rotation thereby rotating the intermediate transfer belt 71 in a predetermined rotating direction D2. In a case where a color image is transferred to the sheet S, the color image is formed by forming the toner images of the individual colors on the photosensitive member 22 and superimposing the resultant toner images on top of each other on the intermediate transfer belt 71. Subsequently, the color image is secondarily transferred onto the sheet S taken out from a cassette 8 on a sheet-by-sheet basis and transported along a transport path F to a secondary transfer region TR2.

In this process, a timing of feeding the sheet S to the secondary transfer region TR2 is managed in order to ensure that the image on the intermediate transfer belt 71 is transferred exactly to a predetermined place on the sheet S. Specifically, a gate roller 81 is provided on the transport path F at place upstream from the secondary transfer region TR2. The gate roller 81 is rotated as timed to a cycling motion of the intermediate transfer belt 71, thereby feeding the sheet S to the secondary transfer region TR2 in a predetermined timing.

The sheet S thus formed with the color image is transported to a discharge tray 89 via a fixing unit 9, a pre-discharge roller 82 and a discharge roller 83, the discharge tray disposed on an upper side of a main body of the apparatus. In a case where the image is formed on the both sides of the sheet S, the rotation of the discharge roller 83 is reversed at a point of time that a trailing end of the sheet S formed with the image on one side thereof is transported to a reversal position PR downstream from the pre-discharge roller 82. Hence, the sheet S is transported along a reversal transport path FR in a direction of an arrow D3. Thereafter, the sheet S is loaded again on the transport path F at place upstream from the gate roller 81. At this time, the sheet S is positioned in a manner that its side opposite from the side previously formed with the image is pressed against the intermediate transfer belt 71 in the secondary transfer region TR2 so as to be transferred with the image. In this manner, the image may be formed on the both sides of the sheet S.

As shown in FIG. 2, the apparatus 1 includes a display section 12 controlled by a CPU 111 of the main controller 11. The display section 12 comprises a liquid crystal display, for example. Based on a control command from the CPU 111, the display section 12 displays a given message informing a user about how to operate the apparatus, the progress of the image forming operations, an occurrence of abnormality in the apparatus, time to change any one of the units, or the like.

In FIG. 2, a reference numeral 113 represents an image memory provided in the main controller 11 in order to store the image supplied from the external apparatus, such as a host computer, via an interface 112. A reference numeral 106 represents a ROM for storage of an operation program executed by the CPU 101 and control data used for controlling the engine EG. A reference numeral 107 represents a RAM for temporary storage of operation results given by the CPU 101 and other data.

A cleaner 76 is disposed in the vicinity of the roller 75. The cleaner 76 is adapted to be moved toward or away from the roller 75 by means of an unillustrated electromagnetic clutch. As moved to the roller 75, the cleaner 76 presses its blade against a surface of the intermediate transfer belt 71 entrained about the roller 75, thereby removing the toner remaining on an outside surface of the intermediate transfer belt 71 after secondary image transfer.

In addition, a density sensor 60 is disposed in the vicinity of the roller 75. The density sensor 60 confronts the surface of the intermediate transfer belt 71 and operates, as required, to take measurement of an image density of the toner image formed on the outside surface of the intermediate transfer belt 71. Based on the measurement results, the apparatus 1 adjusts the operating conditions of the individual parts of the apparatus which may affect image quality. The operating conditions include, for example, a developing bias applied to each of the developer, an intensity the exposure light beam L, tone correction characteristics of the apparatus and the like.

The density sensor 60 employs, for example, a reflective photosensor and is designed to output a signal corresponding to an image density of a region of a given area defined on the intermediate transfer belt 71. With the intermediate transfer belt 71 held in cycling motion, the CPU 101 periodically samples the output signal from the density sensor 60, thereby detecting an image density of an individual part of the toner image on the intermediate transfer belt 71. It is noted here that the "density" of the toner image means the degree of color density of the toner image temporarily carried on the intermediate transfer belt 71 or the amount of toner forming the toner image. Accordingly, the density of the toner image defined above may be different from the final image density (optical density) of the toner image transferred and fixed onto the sheet S.

The structure of the density sensor 60 which detects toner amount of a patch image will now be described. The sensor 60 optically detects the amount of toner which has adhered as a patch image to the intermediate transfer belt 71. As a numerical value which quantatively expresses a patch image density, the CPU 101 then calculates an evaluation value of the patch image which is based on an output signal from the sensor 60.

In the image forming apparatus which has been previously proposed by the inventor of the present invention (described in Japanese Patent Application Laid-Open Gazette No. 2002-116614), the amount of toner adhering as a patch image is calculated in the following manner. That is, light is irradiated upon an image carrier, reflection light from the image carrier is split into p-polarized light and s-polarized light, the amounts of the p-polarized light and the s-polarized light are detected, and the adhering toner amount on the image carrier is calculated based on the ratio of the light amounts.

The more than one light components contained in outgoing light from the image carrier are thus detected individually. Use of these detection results achieves highly accurate measurement of the adhering toner amount which is less susceptible to an influence of a noise, an influence of variations of the amount of irradiation light upon the image carrier, etc.

However, in accordance with a technique for separately detecting more than one light components contained in outgoing light from an image carrier, the levels of detected light amounts and the size of changes of the light amounts are different between the light components. For this reason, the dynamic ranges of light amount detection values of the light components are different from each other. In addition, the detected light amount values of the light components inevitably contain measurement errors.

During calculation of the adhering toner amount based on the detected light amount values representing the more than one light components, the different dynamic ranges or the measurement errors in some cases deteriorates the accuracy, gives rise to an abnormal calculation result or otherwise hampers the calculation of the adhering toner amount. Noting this, the sensor 60 of the image forming apparatus 1 has the following structure, thereby solving these problems.

Figure 3:
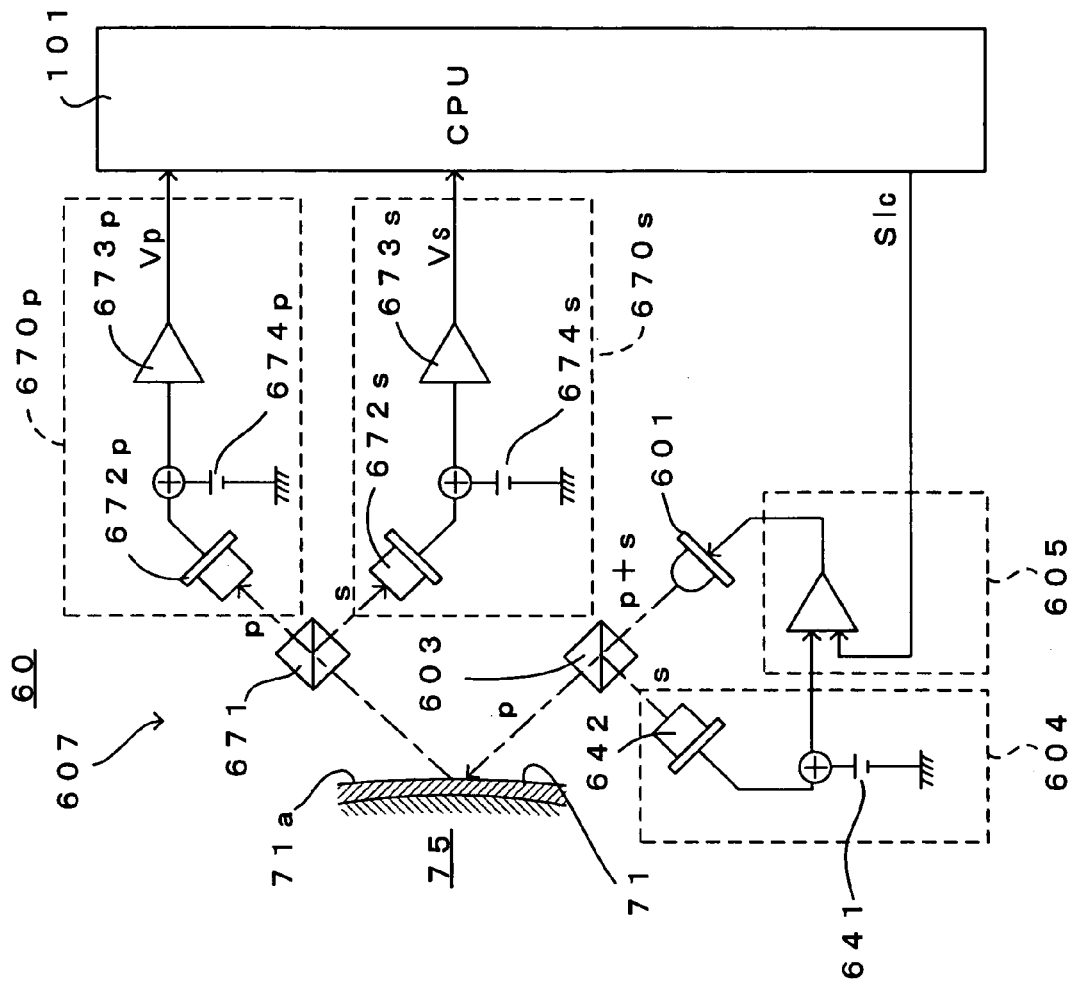
FIG. 3 is a drawing which shows the structure of the density sensor.

FIG. 3 is a drawing which shows the structure of the density sensor. The sensor 60 comprises a light emitter element 601 such as an LED which irradiates light upon a wound area 71a which corresponds to a surface area of the intermediate transfer belt 71 which lies on the roller 75. The sensor 60 also comprises a polarizer beam splitter 603, a light receiver unit 604 for monitoring irradiated light amount and an irradiated light amount adjusting unit 605, to thereby adjust the irradiated light amount of irradiation light in accordance with a light amount control signal Slc which is fed from the CPU 101 as described later.

The polarizer beam splitter 603 is, as shown in FIG. 3, disposed between the light emitter element 601 and the intermediate transfer belt 71. The polarizer beam splitter 603 splits light emitted from the light emitter element 601 into p-polarized light, whose polarizing direction is parallel to the surface of incidence of the irradiation light on the intermediate transfer belt 71, and s-polarized light whose polarizing direction is perpendicular to the surface of incidence of the irradiation light. The p-polarized light as it is impinges upon the intermediate transfer belt 71, while the s-polarized light impinges upon the light receiver unit 604 after emitted from the polarizer beam splitter 603, so that a signal which is in proportion to the irradiated light amount is outputted to the irradiated light amount adjusting unit 605 from a light receiver element 642 of the light receiver unit 604.

Based on the signal from the light receiver unit 604 and the light amount control signal Slc from the CPU 101, the irradiated light amount adjusting unit 605 feedback-controls the light emitter element 601 and adjusts the irradiated light amount of the light irradiated upon the intermediate transfer belt 71 from the light emitter element 601 into a value which corresponds to the light amount control signal Slc. According to this embodiment, the irradiated light amount can thus be changed and adjusted appropriately within a wide range, in accordance with the output signal from the CPU 101.

In the sensor 60 having this structure, an input offset voltage 641 is applied to the output side of the light receiver element 642 of the light receiver unit 604 for monitoring irradiated light amount and the light emitter element 601 is maintained off unless the light amount control signal Slc exceeds a certain signal level.

As the light amount control signal Slc having a predetermined level is fed to the irradiated light amount adjusting unit 605 is fed, the light emitter element 601 turns on and p-polarized light is irradiated as irradiation light upon the intermediate transfer belt 71. The p-polarized light is reflected by the intermediate transfer belt 71. Of light components of the reflection light, a reflection light amount detector unit 607 detects the light amount of the p-polarized light and that of the s-polarized light, and signals corresponding to the respective light amounts are outputted to the CPU 101.

As shown in FIG. 3, the reflection light amount detector unit 607 comprises a beam splitter 671 which is disposed on the optical path of the reflection light, a light receiver unit 670$p$ which receives p-polarized light transmitted by the beam splitter 671 and outputs a signal which corresponds to the light amount of the p-polarized light, and a light receiver unit 670$s$ which receives s-polarized light split by the beam splitter 671 and outputs a signal which corresponds to the light amount of the s-polarized light.

In the light receiver unit 670$p$, a light receiver element 672$p$ receives the p-polarized light from the beam splitter 671, and after an amplifier circuit 673$p$ amplifies an output from the light receiver element 672$p$, and the light receiver unit 670$p$ outputs the resulting amplified signal as a signal which corresponds to the light amount of the p-polarized light. Meanwhile, like the light receiver unit 670$p$, the light receiver unit 670$s$ comprises a light receiver unit 672$s$ and an amplifier circuit 673$s$. Hence, it is possible to independently calculate the light amounts of the light containing the mutually different two components (the p-polarized light and the s-polarized light) among the light components of the reflection light.

Further, in the sensor 60, output offset voltages 674$p$ and 674$s$ are respectively applied to the output side of the light receiver elements 672$p$ and 672$s$, and output voltages Vp and Vs of the signals fed to the CPU 101 from the amplifier circuits 673$p$ and 673$s$ are offset to the positive side.

Figure 4:
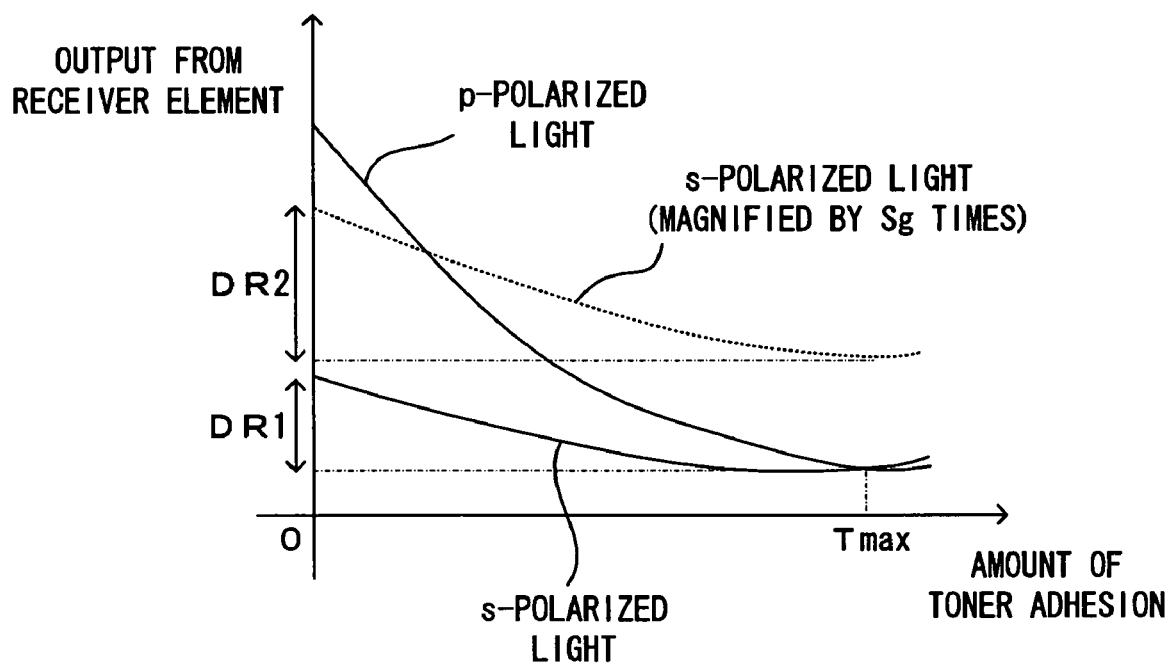
FIG. 4 is a drawing which shows an example of output characteristics of the light receiver elements.

FIG. 4 is a drawing which shows an example of output characteristics of the light receiver elements. Since toner absorbs and scatters the irradiation light from the sensor 60, as shown in FIG. 4, the output voltage at the light receiver element 672$p$, which corresponds to the p-polarized light component, i.e., the same polarized light component as the irradiation light, becomes lower as the amount of toner adhering to the surface area 71$a$ the intermediate transfer belt increases.

On the other hand, since the s-polarized light component is merely a part of the light components created by scattering of the irradiation light, the output voltage at the light receiver element 672$s$ which corresponds to the s-polarized light component is at a lower level than the output from the light receiver element 672$p$ and changes in only a small amount relative to the amount of toner. In short, as for the s-polarized light component, the dynamic range DR1 of the output signal from the light receiver element 672$p$ relative to a toner amount change is narrow. Further, in the vicinity of an adhering toner amount Tmax, the output voltages at the light receiver elements 672$p$ and 672$s$ are at approximately equal levels.

In this sensor, a ratio Sg of the gain of the amplifier circuit 673$s$ to that of amplifier circuit 673$p$ is set as: Sg=3. In other words, the gain on the s-polarized light component is three times as large as the gain on the p-polarized light component, thereby virtually raising the level at the light receiver element 672$s$ as denoted at the dotted line in FIG. 4 and expanding the dynamic range to DR2. Since this also increases the level of the output voltage Vs from the sensor 60, an electric noise coming from a peripheral circuit is less influential.

The sensor 60 will now be described further with reference back to FIG. 3. In the light receiver units 670$p$ and 670$s$ having such structures, as in the case of the light receiver unit 604, the output voltages Vp and Vs have values equal to or larger than zero even when the reflection light amount is zero, and the output voltages Vp and Vs increase in proportion to an increase of the reflection light amount. Thus, application of the output offset voltages 674$p$ and 674$s$ securely eliminates an influence of dead zones (i.e., areas where input voltages are close to zero and not in proportion to output voltages) of the amplifier circuits 673$p$ and 673$s$ which operate in a single-polarity supply operation, and accordingly ensures that output voltages corresponding to the reflection light amount are outputted.

In the image forming apparatus 1 comprising the sensor 60 having structure above, the amount of adhering toner which constitutes a toner image formed on the intermediate transfer belt 71 is detected in the following manner. The adhering toner amount is detected while the CPU 101 controls the respective portions of the apparatus when necessary, e.g., when a patch image is formed and an image forming condition is controlled based on the density of the patch image.

Figure 5:
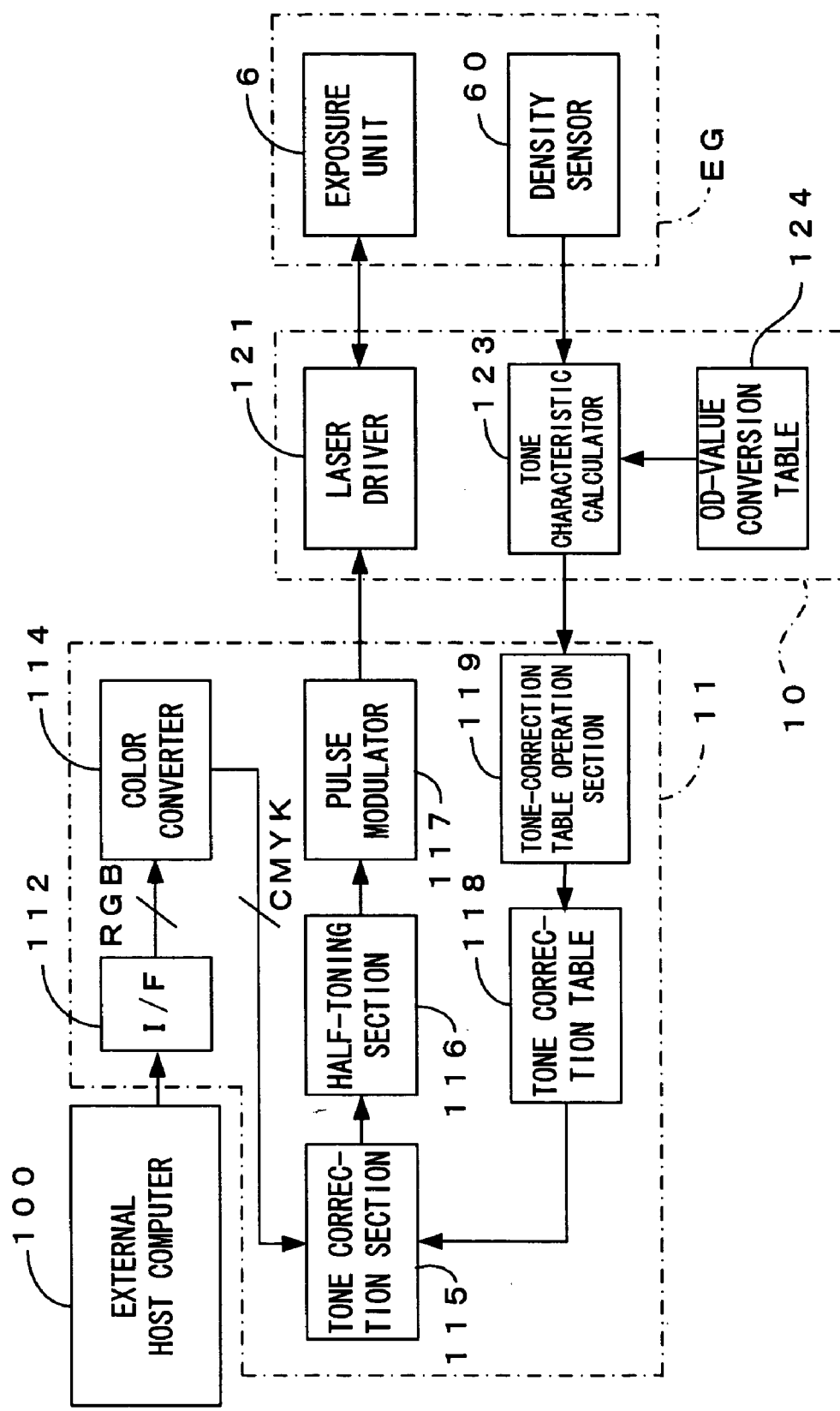
FIG. 5 is a block diagram showing a tone processing block of the image forming apparatus.

FIG. 5 is a block diagram showing a tone processing block of the image forming apparatus. The main controller 11 includes function blocks, which include a color converter 114, a tone correction section 115, a half-toning section 116, a pulse modulator 117, a tone correction table 118, a tone-correction table operation section 119 and the like.

In addition to the CPU 101, the ROM 106 and the RAM 107 shown in FIG. 2, the engine controller 10 further includes a laser driver 121 for driving a laser light source provided at the exposure unit 6, and a tone characteristic calculator 123 for calculating a tone characteristic based on the detection results given by the density sensor 60, the tone characteristic representing the gamma characteristic of the engine EG.

In the main controller 11 applied with the image signal from an external host computer 100, the color converter 114 converts RGB color data into CMYK color data, the RGB color data indicating tone levels of the RGB components of each pixel in an image corresponding to the image signal, the CMYK tone data indicating tone levels of CMYK components corresponding to the RGB components. In the color converter 114, the input RGB tone data comprise 8 bits per color component for each pixel (or representing 256 tone levels), for example, whereas the output CMYK color data similarly comprise 8 bits per color component for each pixel (or representing 256 tone levels). The CMYK color data outputted from the color converter 114 are inputted to the color correction section 115.

The corrected CMYK color data thus obtained are inputted to the half-toning section 116. The half-toning section 116 performs a half-toning process, such as an error diffusion process, a dithering process or a screening process, and then supplies the pulse modulator 117 with the half-toned CMYK data comprising 8 bits per color component for each pixel.

The half-toned CMYK data inputted to the pulse modulator 117 indicate respective dot sizes of CMYK color toners to be made to adhere to each pixel, and arrays of the color toner dots. Based on such half-toned CMYK data thus received, the pulse modulator 117 generates a video signal for pulse width modulation of an exposure laser pulse for forming each of CMYK color images, the exposure laser pulse controlled by the engine EG. Then, the pulse modulator 117 outputs the resultant signal to the engine controller 10 via a video IF not shown. In response to the video signal, the laser driver 121 provides ON/OFF control of a semiconductor laser of the exposure unit 6 whereby an electrostatic latent image of each of the color components is formed on the photosensitive member 21. Normal printing operations are performed in this manner.

Furthermore, the image forming apparatus 1 makes adjustment of image forming conditions per toner color in a predetermined timing in order to maintain the adequate image quality. The adjustment operation is carried out, for example, immediately after the apparatus is energized, or after a long duration of a standby state where the image forming operations are not carried out.

Figure 6:
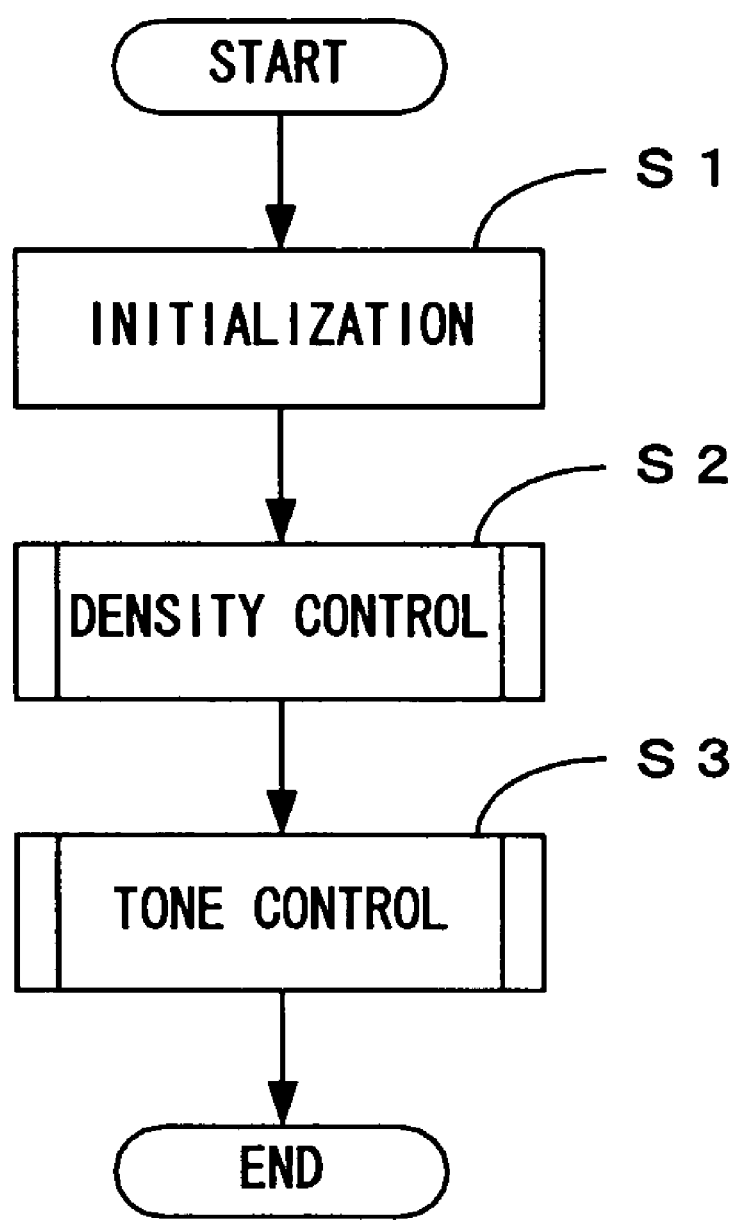
FIG. 6 is a flow chart representing the steps of the adjustment of the image forming conditions according to the embodiment.

FIG. 6 is a flow chart representing the steps of the adjustment of the image forming conditions according to the embodiment. In the adjustment operation, an initializing operation is first performed for cleaning the photosensitive member 22 and the intermediate transfer belt 71, positioning the developing unit at the predetermined position and such (Step S1). Subsequently, a density control process is carried out for adjusting the operating conditions of the apparatus in order to attain a desired image density (Step S2). Subsequently, a tone control process is carried out for compensating for the gamma characteristics of the apparatus thereby obtaining good tone reproducibility (Step S3).

Figure 7:
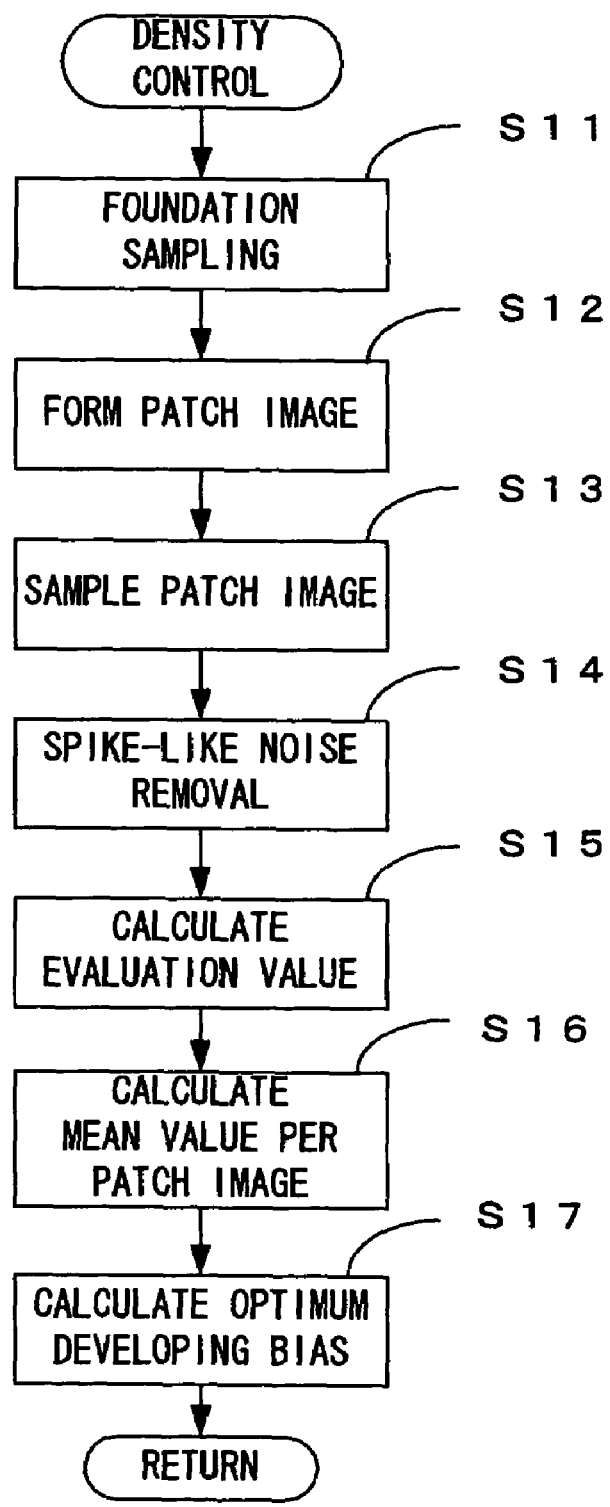
FIG. 7 is a flow chart representing the steps of the density control process according to the embodiment.

FIG. 7 is a flow chart representing the steps of the density control process according to the embodiment. There have heretofore been known a variety of density control factors affecting the image density. In addition, a great number of proposals have been made on techniques for optimizing the density control factors thereby achieving the desired image density. It is also possible to apply such techniques to the embodiment. As one example of such applications, description is made on a technique for determining the optimum value of the developing bias, as the density control factor, applied to the developing roller 44. However, it is noted that the density control factor and the adjustment thereof are not limited to this example.

According to the density control process, the surface of the intermediate transfer belt 71 having been just cleaned off the toner image is first subjected to a foundation sampling wherein the output signal from the density sensor 60 is sampled (Step S11). The foundation sampling is performed in order to cancel the influences of the surface conditions of the intermediate transfer belt 71 that may affect the results of density detection of a patch image, the density detection performed subsequent to the foundation sampling. Specifically, a light reflected from the patch image and received by the density sensor 60 also contains light components reflected from the surface of the intermediate transfer belt 71 as a foundation of the image. On this account, the apparatus samples not only the amount of light reflected from the surface of the intermediate transfer belt 71 carrying the patch image thereon, but also the amount of light reflected from the intermediate transfer belt carrying no image thereon. These sampling results are used to determine the density of the patch image whereby the influences of the surface conditions of the intermediate transfer belt 71 are eliminated. A specific calculation method will be described hereinlater.

The foundation sampling is performed on plural points on the surface of the intermediate transfer belt 71. Specifically, with the intermediate transfer belt 71 revolved at a constant speed, the CPU 101 samples the outputs from the density sensor 60 at constant time intervals, thereby obtaining sampling results from the plural points located at mutually different positions along the moving direction D2 of the intermediate transfer belt 71. These sampling results are stored in the RAM 107 provided in the engine controller 10. It is noted here that the outputs Vp, Vs from the density sensor 60 corresponding to the sampling points x (x=0, 1, 2, . . . ) are expressed as $Tp1(x)$, $Ts1(x)$, respectively.

Now, description is made on the points on the intermediate transfer belt 71 which are subjected to the foundation sampling. As will be described hereinlater, the embodiment calculates an "evaluation value", as a parameter indicative of a net density of the patch image, based on the respective sampling results obtained by performing the foundation sampling processes before and after the formation of the patch image, the respective foundation sampling processes performed on the same points on the intermediate transfer belt 71. Therefore, the foundation sampling must be performed on the points on the surface of the intermediate transfer belt 71, on which points the patch image is to be formed afterwards. The embodiment defines the points to be subjected to the foundation sampling as follows.

Figure 8:
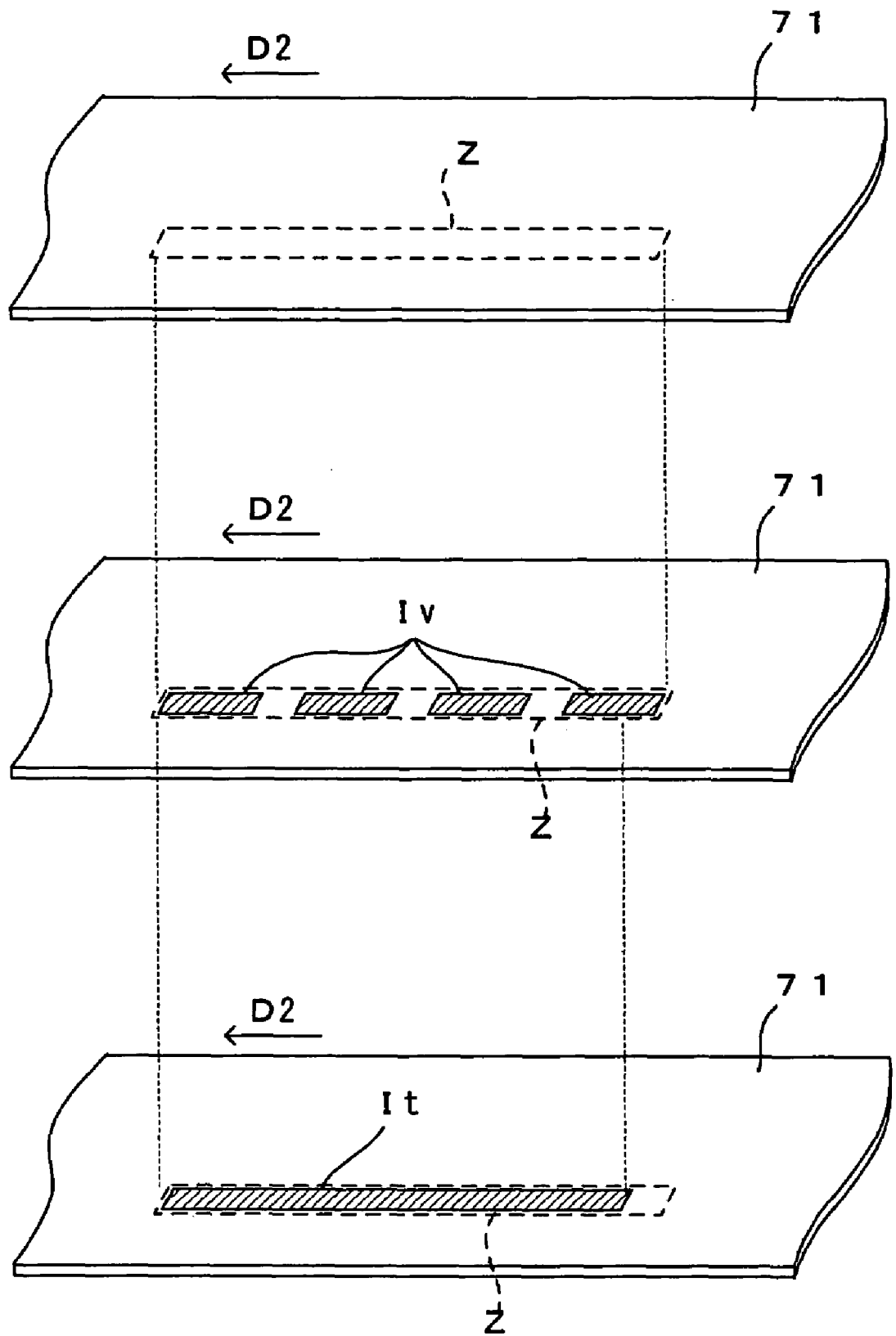
FIG. 8 is a group of diagrams showing a patch-image forming position on the intermediate transfer belt.

FIG. 8 is a group of diagrams showing a patch-image forming position on the intermediate transfer belt 71. In this embodiment, four patch images Iv are formed in the density control process whereas a single patch image It is formed in the tone control process. The patch images Iv for density control are formed in a rectangular shape extended along the moving direction D2 of the intermediate transfer belt 71. In addition, the four patch images Iv for density control are arranged with suitable spacing in a phantom region Z on the intermediate transfer belt 71, as shown in FIG. 8. The patch image It for tone control is also formed in the phantom region Z, having a rectangular shape extended along the moving direction D2 of the intermediate transfer belt 71. That is, the forming positions for the density-control patch images Iv and for the tone-control patch image It are designed to form the greatest possible overlap therebetween on the intermediate transfer belt 71.

Therefore, the foundation sampling may be performed on the individual points in the phantom region Z on the intermediate transfer belt 71, such that the sampling results obtained therefrom may be used in both the density control process and the tone control process. There is no need for performing the foundation sampling on areas but for this region. The following working effects may be attained by forming the density-control patch images Iv and the tone-control patch image It at such positions as to form the greatest possible overlap therebetween and by sharing the results of the foundation sampling obtained from the overlapped portion. That is, time required for the foundation sampling may be reduced as compared with a case where the patch images Iv are formed at positions totally out of correspondence to that of the patch image It. Furthermore, this approach saves on the resource of the memory for storing the sampling results. The working effects may be attained by defining the forming positions of the density-control patch images and the tone-control patch image in a manner to form a partial overlap therebetween. However, the working effects are enhanced notably by forming the greatest possible overlap between these positions, as suggested by the embodiment.

Returning to FIG. 7, the density control process is described further. Subsequent to the foundation sampling, the individual parts of the engine EG are driven to form patch images of predetermined image patterns on the intermediate transfer belt 71 in the following manner. Each of the patch images is formed at each of the values of the developing bias voltage as a density control factor, the developing bias voltage varied in multiple steps (Step S12). Outputs from the density sensor 60 are sampled at the respective positions of the patch images thus formed (Step S13). It is noted here that the outputs Vp, Vs from the density sensor in correspondence to the sampling point x are expressed as $Dp1(x)$, $Ds1(x)$, respectively. The following description is made on the assumption that the patch images are formed at the respective values of the developing bias Vb varied in 4 steps.

Figure 9A:
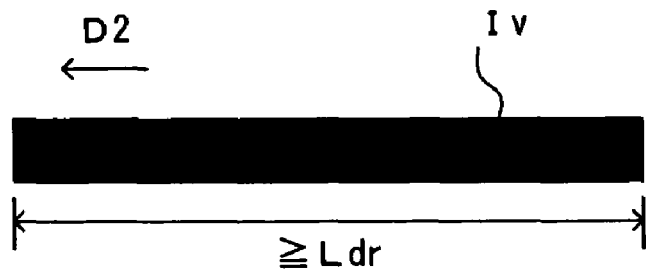
FIG. 9A is a diagram showing the patch image for density control.

FIG. 9A is a diagram showing the patch image for density control. The figure depicts a shape of a single patch image Iv. Specifically, the patch image Iv is a rectangular solid image extended along the moving direction D2 of the intermediate transfer belt 71. The patch image has a length of a circumferential length Ldr of the developing roller 44 or more. The length of the patch image Iv is defined to be the circumferential length Ldr of the developing roller 44 or more for the following reason. The image forming apparatus of this type may sometimes encounter periodically varied image densities because of the structural reason of the developing roller 44, such as eccentricity of the roller or variations of the characteristics thereof. If the patch image Iv has the length equal to or greater than the circumferential length Ldr of the developing roller, the influences of such variations of the image density may be eliminated by averaging the image densities detected at the individual points.

The patch image Iv is formed in a width which is greater than that of a surface region, or a "detection region", on the intermediate transfer belt 71, the region reflecting light to be detected by the density sensor 60. That is, an amount of reflected light from a certain region within the patch image Iv may be detected by reading an output signal from the density sensor 60. Thus, the width of the patch image Iv is defined to be greater than the width of the detection region so that the output signal from the density sensor 60 may reflect the density of the solid image as the patch image Iv. As a matter of course, the length of the patch image Iv is longer than that of the detection region.

Figure 9B:
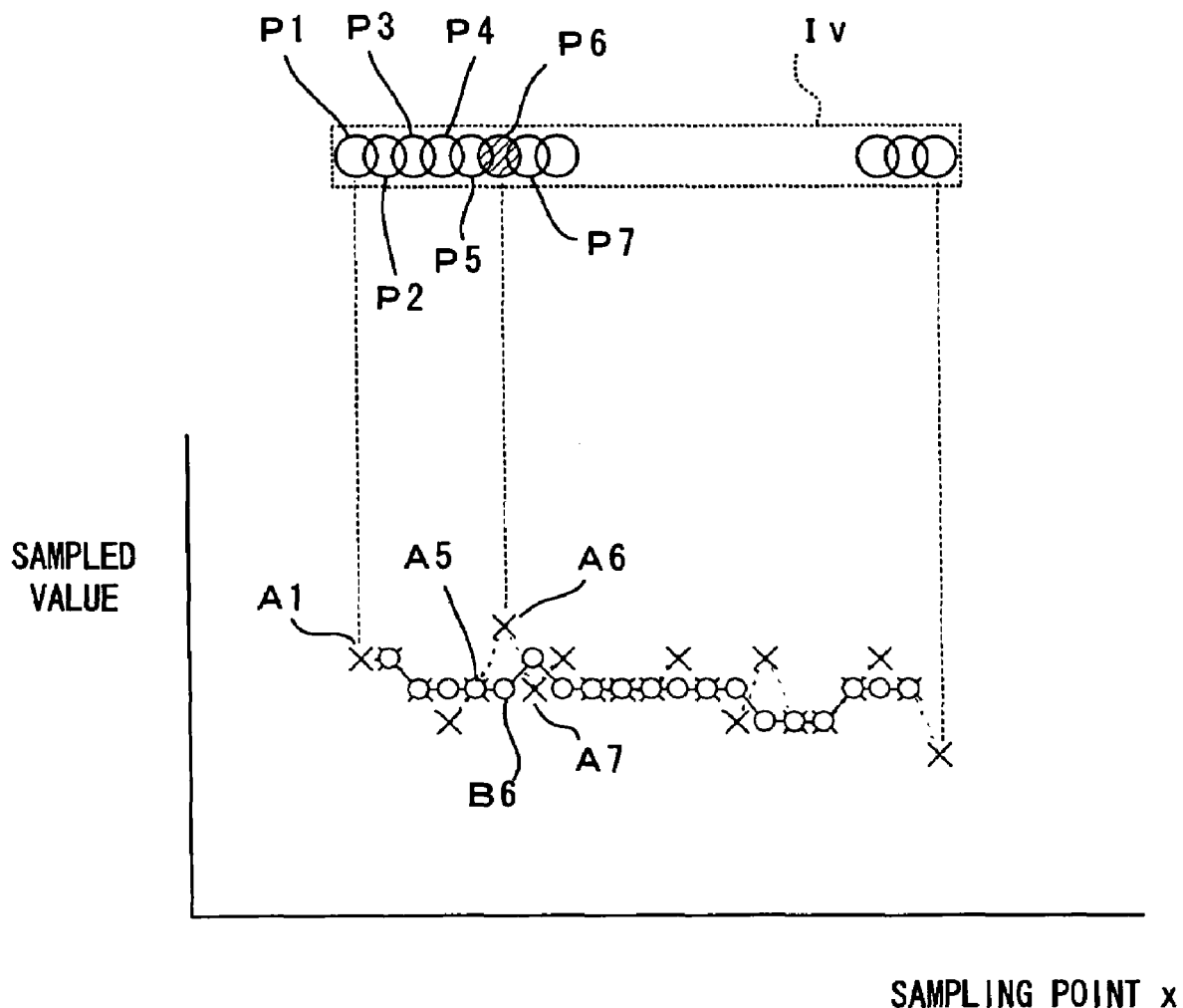
FIG. 9B is a diagram explanatory of the sampling points in the patch image.

FIG. 9B is a diagram explanatory of the sampling points in the patch image. The figure shows that image densities at plural detection regions P1, P2, . . . in the patch image Iv can be detected by performing the sampling while moving the intermediate transfer belt 71.

The sampling results of the foundation and of the patch image Iv obtained by such sampling operations may contain spike-like noise components resulting from mars or dirts on the intermediate transfer belt 71 or electrical noises entering the density sensor 60. Hence, a process for removing such spike-like noises is performed (Step S14 in FIG. 7). The spike-like noise removal process may be carried out in the following manner, for example.

Valid density information removed of the noises may be obtained by performing a smoothing or filtering process on individual sampled data pieces included in a sample data array. The smoothing or filtering process is performed using a sampled data piece of interest and the preceding and succeeding data pieces. For instance, the spike-like noises may be removed by replacing a sampled data piece on one sampling point with a median value of sampling results of three points including the subject sampling point and the next preceding and succeeding sampling points.

For instance, a sampling result A6 of a cross-hatched detection region P6 shown in FIG. 9B is considered to be affected by the influences of the noises because a value thereof rapidly fluctuates from those of sampling results of the neighboring points. Hence, the sampling result A6 is compared with each of sampling results A5 and A7 of the next preceding and succeeding detection region P5 and P7. Then, a median value (A5) of these values is used as a density information piece B6 indicative of the image density at the detection region P6, so that the influences of the noises may be decreased. The sampling results of the other points may be processed the same way, whereby the original sample data array represented x in FIG. 9B is replaced by a data array removed of the influences of the noises, as represented by ○ in FIG. 9B. This process is also applicable to sampling results of the tone-control patch image to be described hereinlater.

The following procedure may be taken to remove the noises from sampling results of an image formed based on the premise that the image is an even image, such as the density-control patch image Iv. Specifically, a predetermined number of data pieces of higher order and a predetermined number of data pieces of lower order are excluded from the sampling results of plural points in the image, the predetermined number defined according to the incidence of the noises. Each of the excluded data pieces is replaced by a mean value of the remaining data pieces. For instance, in a case where the sampling is performed on 20 points in the patch image Iv and it is known from the results of a previous test that the incidence of noises contained in the sampled data is on the order of 20%, two data pieces of higher order and two data pieces of lower order are picked out from the 20 sampled data pieces. A mean value of the 16 remaining data pieces is determined. The mean value thus determined is used in place of the four data pieces as a density information piece corresponding to each of the four points.

The spike-like noise removal process is performed on both of the foundation sampling results and the sampling results of the patch images, thereby obtaining the noise-free density information on the base and on the patch images. Hereinafter, density information pieces obtained by subjecting individual sampled data pieces $Tp1(x)$, $Ts1(x)$, $Dp1(x)$ and $Dp1(x)$ to the aforesaid noise removal process will be expressed as $Tp2(x)$, $Ts2(x)$, $Dp2(x)$ and $Dp2(x)$, respectively. When the post-process numerical values thus obtained are stored, the post-process numerical values may be written over individually corresponding pre-process numerical values stored in a memory region. This obviates the increase of memory occupation dedicated to the storage of the numerical values.

The following equations (Equation 1), (Equation 2) are used to determine mean values Tave, Tpave of the density information, which are committed to storage:

$$Tave = Sg \times AVG(Tp2(x)-Vp0) - AVG(Ts2(x)-Vs0) \quad \text{(Equation 1)}$$

$$Tpave = AVG(Tp2(x)-Vp0) \quad \text{(Equation 2)}$$

It is noted here that AVG(f(x)) is defined as an operator for determining a mean value of the entire range of x which is a variable for a function f(x). The values Vp0 and Vs0 represent dark outputs from the density sensor 60, which mean output voltages Vp and Vs outputted from the density sensor 60 when an amount of irradiation light is zero. Thus, these values are equivalent to output offset voltages from an output circuit of the density sensor 60.

The coefficient Sg is a gain correction coefficient for the density sensor 60. According to the embodiment, as described before, an s-polarized component receiver of the density sensor 60 is imparted with a greater gain than that of a p-polarized component receiver in order to improve the S/N ratio. The aforesaid gain correction coefficient Sg is for equally weighting both the polarized light components by compensating for a gain difference therebetween.

The net image density of the patch image is determined based on the density information thus determined. In this embodiment, however, the image density is not directly determined but the "evaluation value" as the parameter indicative of the image density is calculated (Step S15).

The embodiment takes it into consideration that optical properties of a color toner significantly differ from those of an achromatic black toner. Hence, the embodiment performs processes using individually different equations for a patch image formed from the color toner and for a patch image formed from the black toner. However, these equations share a common basic concept and hence, the following description is made on processes performed on the patch image formed from the color toner. A group of the different equations for the black toner will be cited hereinlater.

First, a density data piece $Fc(x)$ indicative of the net image density of the patch image formed from the color toner is obtained using the following equation for removing the influences of the surface conditions of the intermediate transfer belt 71:

$$Fc(x) = Sg \times \{Dp2(x) - Vp0\} - \{Ds2(x) - Vs0\} \times Tave/[Sg \times \{Tp2(x) - Vp0\} - \{Ts2(x) - Vs0\}] \quad \text{(Equation 3)}$$

It is noted here that the appended character c in the left side indicates a value corresponding to the color toner. While the equation per se is common to the toners of cyan, magenta and yellow, the value of the density data piece $Fc(x)$ naturally varies from one toner color to another. In this respect, the same holds for the following equations.

Next, the density data piece $Fc(x)$ thus determined is converted into an evaluation value $Gvc(x)$. The "evaluation value" is an expression of the patch image density normalized using a value ranging between 0 and 1. The density sensor 60 employing the reflective photosensor provides the output voltage which is lowered in correspondence to the increase of the amount of received light. Accordingly, the value of the aforesaid density data piece $Fc(x)$ is decreased in correspondence to the increase of the image density and thence, is difficult to handle. Therefore, the evaluation value $Gvc(x)$ is introduced which presents a value increased in correspondence to the increase of the image density. The evaluation value $Gvc(x)$ is calculated based on the following equation:

$$Gvc(x) = 1 - Fc(x)/Tave \quad \text{(Equation 4)}$$

In some cases, a result of the (Equation 4) assumes a negative value or a value exceeding 1 due to errors occurring in the sampling process and calculation processes. In such a case, the calculation result may be rounded to either 0 or 1.

On the other hand, the black toner may be addressed in a similar manner. In this case, the following equations may used in place of the aforesaid (Equation 3) and (Equation 4):

$$Fk(x) = \{Dp2(x) - Vp0\} \times Tpave/\{Tp2(x) - Vp0\} \quad \text{(Equation 3A)}$$

$$Gvk(x) = 1 - Fk(x)/Tpave \quad \text{(Equation 4A)}$$

It is noted here that the appended character k in the left side indicates a value corresponding to the black toner.

Subsequently, the evaluation values $Gvc(x)$, $Gvk(x)$ for the color toner and for the black toner are handled the same way. Hence, the following description does not differentiate the evaluation value $Gvc(x)$ for the color toner from the evaluation value $Gvk(x)$ for the black toner. Thus, the evaluation values for these toners will be hereinafter expressed as $Gv(x)$ with the appended character indicating the toner color omitted.

Subsequently, a mean value for each patch image is calculated based on the evaluation values $Gv(x)$ thus determined (Step S16). Thus is determined the evaluation value for each patch image wherein the influences of the density variations caused by the eccentricity or such of the developing roller 44 are cancelled. Then, an optimum value of the developing bias for controlling the image density to a target density is calculated based on the resultant evaluation value (Step S17).

FIG. 10 is a graph explanatory of the principles of a calculation method for optimum developing bias. Assume that a developing bias Vb is set to four different voltage values Vb1, Vb2, Vb3 and Vb4 whereas each patch image is formed at each of the four different developing biases. The evaluation values Gv (mean value) of the patch images formed at the individually different developing biases are represented by Gv1, Gv2, Gv3 and Gv4, respectively. Plotting the evaluation value Gv against the developing bias Vb gives a graph shown in FIG. 10, for example. An optimum value Vbopt of the developing bias that provides an evaluation value Gv_tgt corresponding to the target image density may be determined from this relationship. In this example, the optimum developing bias Vbopt providing the target image density may be calculated by properly interpolating between two points corresponding to the two developing biases Vb3 and Vb4.

In this manner, the optimum value Vbopt of the developing bias Vb for adjusting the image density to the target density is calculated. Other control factors such as the intensity of the exposure light beam L may be optimized the same way. When the optimum value of the density control factor is thus determined, the subsequent image forming operations may be performed with the density control factor set to the optimum value thereof, thereby forming the toner image of a desired image density.

Next, description is made on the tone control process (Step S3 in FIG. 6) according to the embodiment, the tone control process performed subsequent to the density control process. The tone control process is carried out as follows. The engine EG forms a tone patch image for tone control on the intermediate transfer belt 71 on a per-toner-color basis, the tone patch image previously designed for taking measurement of the gamma characteristics. Image densities of each tone patch image are sensed by the density sensor 60. Based on the signals from the density sensor 60, the tone characteristic calculator 123 generates tone characteristic data (the gamma characteristics of the engine EG) correlating individual tone levels of the tone patch image with the individual image densities thus detected. The tone characteristic calculator provides an output to the tone-correction table operation section 119 of the main controller 11. Based on the tone characteristics supplied from the tone characteristic calculator 123, the tone-correction table operation section 119 performs an operation for giving tone correction table data used for obtaining idealistic tone characteristics by compensating for the measured tone characteristics of the engine EG Subsequently, the tone-correction table operation section 119 updates the contents of the tone correction table 118 to the operation results. In this manner, the tone correction table is re-defined. The tone control process will be described in more details as below.

Figure 11:
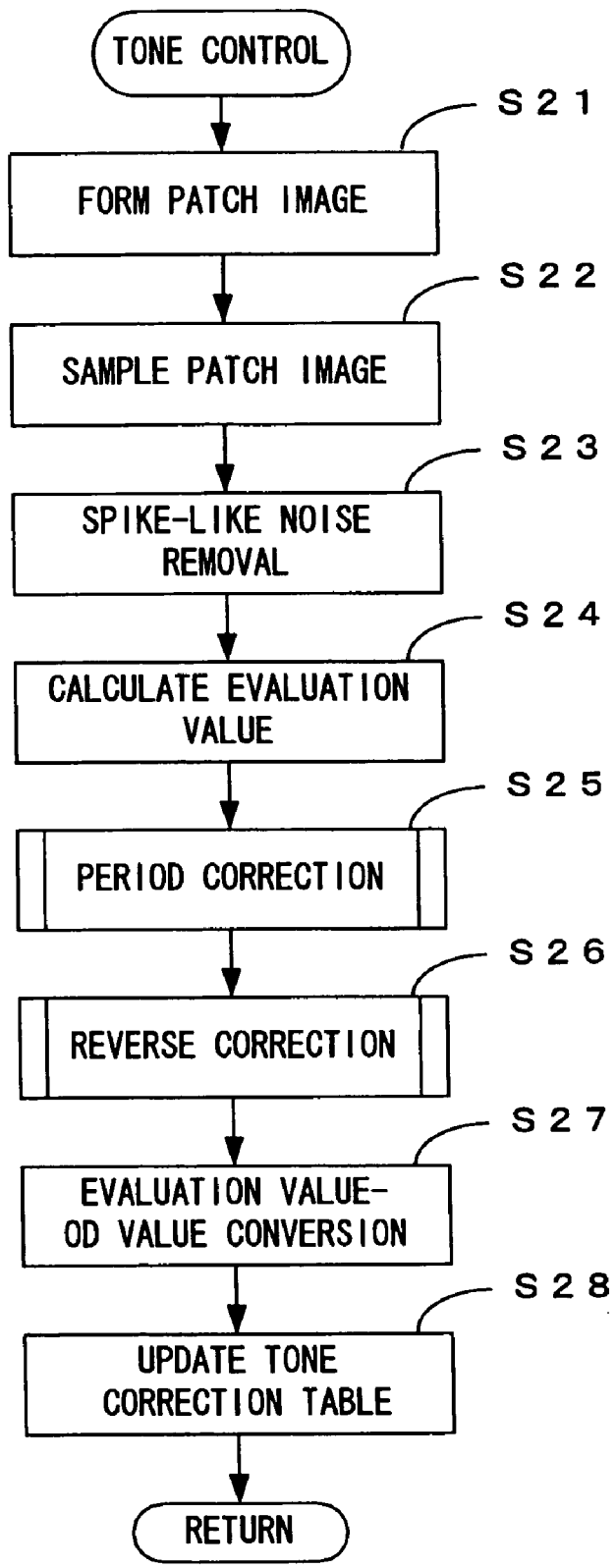
FIG. 11 is a flow chart representing the steps of the tone control process according to the embodiment.

FIG. 11 is a flow chart representing the steps of the tone control process according to the embodiment. A basic flow of the tone control process is resemblant to that of the density control process shown in FIG. 7. As mentioned supra, the tone-control patch image and the density-control patch images are formed at such positions as to form the greatest possible overlap therebetween whereas the region Z including these forming positions are already subjected to the foundation sampling. Therefore, the process may be started with forming the patch image, omitting the foundation sampling (Step S21).

Figure 12:
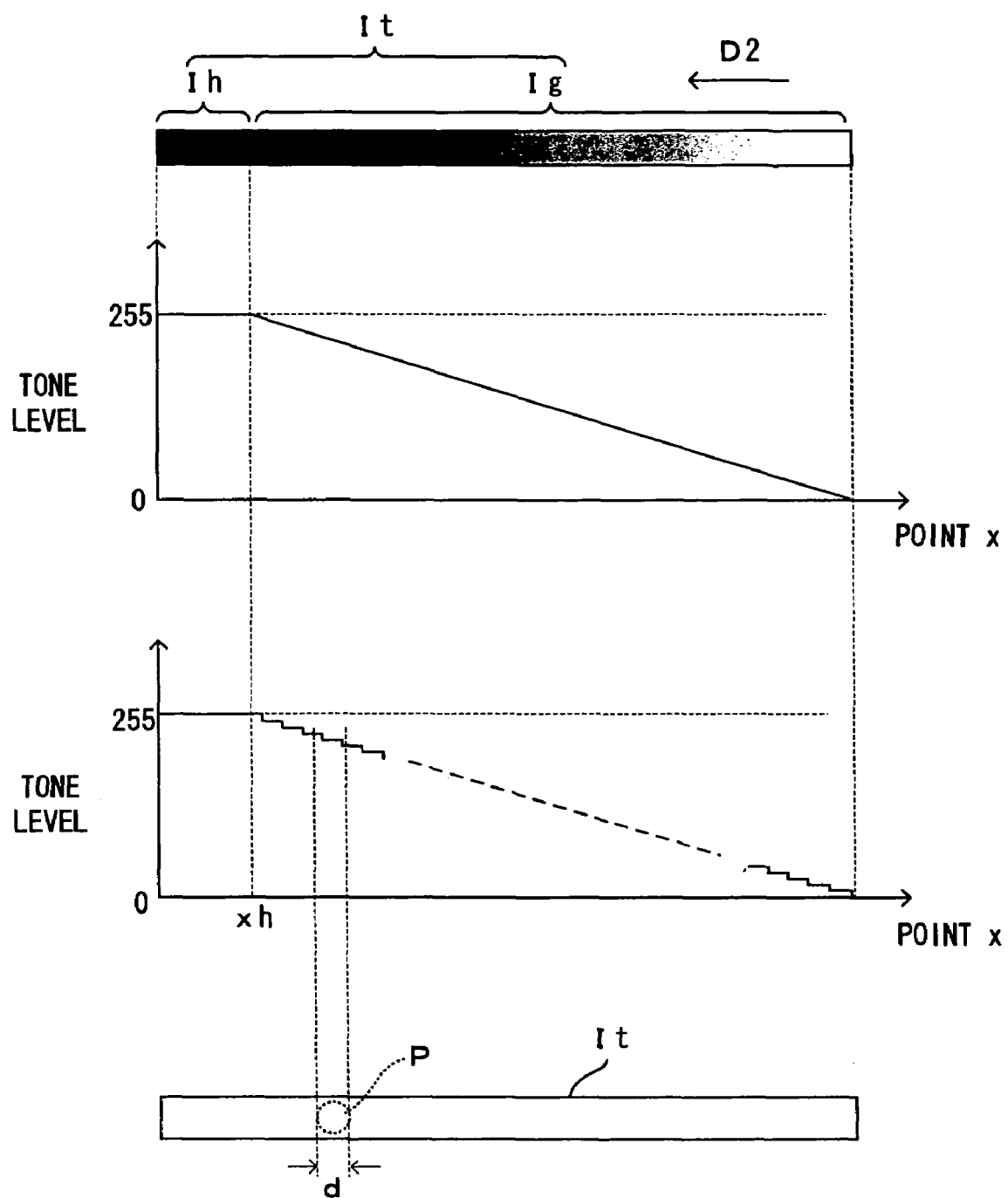
FIG. 12 is a diagram showing the patch image for tone control.

FIG. 12 is a diagram showing the patch image for tone control. As shown in an upper part of FIG. 12, the tone-control patch image It is formed in a rectangular shape extended along the moving direction D2 of the intermediate transfer belt 71 and besides, is varied the tone level thereof. The tone level is continuously varied from the maximum level (Level 255) to the minimum level (Level 0) along the moving direction D2. However, a header image portion Ih of a solid image is provided at a leading end portion (x=0 to xh) of the image, the header image portion having a length of the circumferential length Ldr of the developing roller 44 or more.

In the process of forming the tone patch image It, firstly formed on the photosensitive member 22 is the header image portion Ih having a given width and extended along the direction D2 in the length of the length Ldr or more. The header image portion Ih is followed by a gradation image portion Ig progressively varied in the tone level from the maximum level to the minimum level and having the same width as the header image portion (or a narrower width than that of the header image portion). The image formed in this manner is transferred to the intermediate transfer belt 71 to provide the tone-control patch image It. The reason for designing the patch image It in this pattern will be described hereinlater. Besides the image wherein the tone level is continuously varied in the gradation image portion Ig, an image with the tone level varied in stepwise, as represented by a middle part of FIG. 12, may also be used as the patch image It.

In either image patterns, the tone level is varied in a detection region P on the intermediate transfer belt 71, as indicated by a lower part of FIG. 12. Although the tone level is not constant in the detection region P, an image density at each tone level may be detected such that the tone characteristics of the apparatus may be determined properly. The reason will be described as below.

Figure 13:
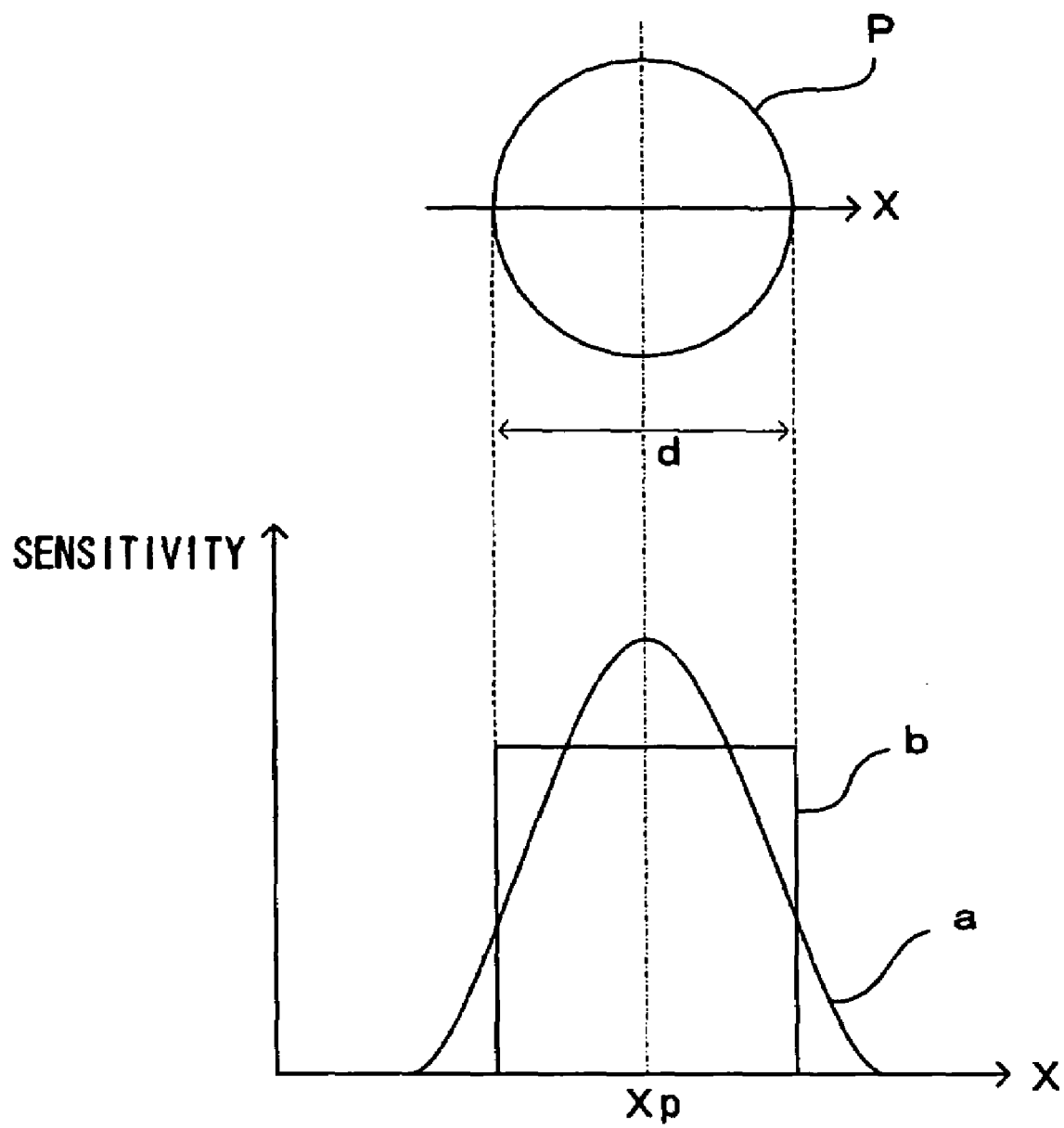
FIG. 13 is a diagram illustrating a detection region for the density sensor.

FIG. 13 is a diagram illustrating a detection region for the density sensor. The density sensor 60 receives light reflected from each point in the detection region P on the surface of the intermediate transfer belt 71 and then, outputs a voltage corresponding to the amount of received light. While the shape of the detection region P depends upon the structure of the density sensor 60, description is made here on assumption that the detection region is shaped like a circle having a diameter d, as shown in FIG. 13. The detection region may have another shape such as oblong or rectangle. In order to increase the detection accuracies, however, the detection region may preferably have a symmetrical shape with respect to its axis (x=xp) as shown in FIG. 13.

The sensor normally has sensitivities at the individual points in the detection region P which are peaked at the center of the detection region P but are progressively decreased toward the circumference thereof, for example, as indicated by a Gaussian curve a of FIG. 13. In the interest of easy comprehension, however, the description is made here on assumption that the density sensor 60 has a constant sensitivity in the detection region P as indicated by a curve b. A case where the sensitivity is varied will be discussed hereinlater.

Consider a case where the density sensor 60 having such a sensitivity characteristic detects the density of the patch image It shown in the upper part of FIG. 12, for example. The image density of the patch image It is varied in the detection region P in a continuous and consistent manner. Therefore, the image density is progressively decreased from that at the center (x=xp) of the detection region P toward one end of the region with respect to the moving direction D2, whereas the image density is progressively increased toward the other end of the region. However, the density sensor 60 is incapable of detecting such variations of the image density so that the image density of the detection region P as determined based on the amount of light received therefrom represents a mean image density of the region. Therefore, the image density of the detection region P as determined based on the output from the density sensor 60 represents the image density at one tone level corresponding to the center thereof or the point x=xp, although the tone level is varied in the detection region P.

In the conventional image forming apparatus, it is required to form a patch image larger than the detection region P and having a constant tone level in order to determine the image density at one tone level. Hence, a large number of such patch images must be formed for determination of the image densities at multiple tone levels. This results in the increase of toner consumption and of process time. As a solution to such a problem, there is known a conventional technique wherein the tone characteristics are estimated from the image densities of a given number of typical patch images formed at discrete tone levels. However, the number of measured samples is so small that the measurement results may fail to reflect fine density variations between the samples. Thus, the technique falls short of providing the correction with an adequate degree of accuracies.

In the image forming apparatuses such as copiers or those featuring a scanner function, wherein a high-resolution reading sensor is provided as an essential element for generating the image signal based on an original document supplied thereto, it may be contemplated to use the reading sensor as the density sensor.

For instance, Japanese Patent Application Laid-Open Gazette No. 6-311365 discloses an image input/output apparatus adapted to perform the tone correction as follows. A test pattern continuously varied in the tone is printed on a recording sheet. Image densities of the test pattern are read by means of a CCD line sensor so as to be used for the tone correction. Unfortunately, however, the apparatus performs the tone correction process with the proviso that an operator is involved in the execution of the process, the operator taking out the recording sheet with the test pattern printed thereon, setting the recording sheet on a document glass and manipulating a given key to start a reading operation. That is, the arrangement of the above apparatus is totally different from the image forming apparatus and the control method thereof according to the invention wherein the density sensor 60 is provided whereas the tone correction process is accomplished solely by operations carried out within the apparatus, as will be described hereinlater.

In addition, the image forming apparatus of the embodiment permits the use of the patch image It including plural tone levels in the detection region P corresponding to the resolution of the density sensor 60. Therefore, the apparatus is capable of accurately detecting each image density at each tone level without requiring the large patch images formed at the individual tone levels. At whatever position in the tone-control patch image It the detection region P may be defined, the patch image varied in the tone level in the continuous and consistent manner, the detection result given by the density sensor 60 always represents the image density at the tone level corresponding to the center of the detection region P thus defined. Therefore, an image density at any tone level can be determined by defining the detection region P at a suitable position in such a patch image It and performing the density detection. Accordingly, the measurements of the tone characteristics of the engine EG can be obtained from an arbitrary number of samples by repeating the density detection operation in a required number of cycles as shifting the detection region P in a single tone-control patch image It. The length of the patch image It may be reduced by varying the tone level at such a short pitch. This leads to the reduction of time taken to form the patch image and to perform the density detection as well as to the reduction of the toner consumption.

The embodiment provides the greatest possible number of samples in order to obtain an even smoother tone characteristic curve to afford an even more exact tone correction. Similarly to the case of the density-control patch image Iv shown in FIG. 9A, the density detection is performed on the tone-control path image It at plural different points with respect to the transporting direction D2 of the intermediate transfer belt 71. Furthermore, the detection regions P corresponding to the individual points are arranged in a manner that a respective pair of adjoining detection regions P partially overlap with each other. Such an arrangement provides for the exact density detection without ignoring any density variations of the patch image It corresponding to the individual variations of the tone level thereof. Based on the tone characteristics thus measured, the correction may be performed with higher accuracies. Incidentally, it is not always necessary for adjoining detection regions P to partially overlap with each other. The adjoining detection regions may be spaced away from each other.

The patch image It having the tone level varied stepwise may be processed the same way. In such a patch image, the tone level varies at a smaller pitch than the diameter d of the detection region P for the density sensor 60 and hence, the detection region P contains therein images formed at plural tone levels. The tone levels on the opposite sides with respect to the center (x=xp) of the detection region P vary in the opposite ways. Hence, the density fluctuations based on the different tone levels on the opposite sides are offset. As a result, the density sensor 60 provides an output substantially equal to an image density at the center of the detection region P. From the standpoint of the density sensor 60, such microscopic stepwise variations of the tone level in the patch image It may be regarded as substantially continuous and consistent variations of the tone level.

The foregoing description has been made on the assumption that the density sensor 60 has the constant detection sensitivity. In the actual apparatus, however, the detection sensitivity is generally peaked at the center of the detection region P and decreased toward the circumference thereof, as indicated by the curve a shown in FIG. 13. In actual fact, therefore, the image density at the circumference of the detection region P is less reflected in the detection results, whereas the image density at the center is more conspicuously reflected in the detection results. That is, the sensitivity of the density sensor is lowered at the circumference of the detection region P so that the image density at the circumference of the region has an inherently minor influence on the results of density detection. What is more, the density fluctuations on the opposite sides with respect to the center of the region are cancelled. Therefore, it is possible to accurately detect only the image density at the center of the detection region P in the patch image It by performing the density detection in the aforementioned manner.

Returning to FIG. 11, the tone control process is described further. In the patch image It formed in this manner, the output signals from the density sensor 60 are sampled, the density sensor detecting the densities at plural different points as shifting the sampling point (Step S22). Similarly to the density control process, the sampling results are subjected to the spike-like noise removal process (Step S23).

FIG. 14 is a graph explanatory of a process for spike-like noise correction. There may be a case where a curve obtained by plotting the sample value against the sampling point may contain at random sample values notably deviated from their neighboring sample values, as indicated by x in FIG. 14. Given the mode of the patch image It shown in FIG. 12, it is unthinkable that an abrupt increase or decrease of the image density locally occurs in the patch image. Hence, such a phenomenon is believed to result from the aforementioned spike-like noises. It is therefore necessary to remove such noises prior to the calculation of the patch image density.

According to the embodiment, the following correction process is performed on the resultant sample data array in order to remove such spike-like noises. Specifically, a sample value for a target sampling point and sample values for the next preceding and succeeding sampling points are extracted so as to determine a median value thereof. The sample value for the target sampling point is replaced by the median value. As to a sampling point x1 shown in FIG. 14, for example, a median value of a sample value $A(x1)$ for the target sampling point x1 and sample values $A(x0)$ and $A(x2)$ for the next preceding and succeeding sampling points, which is the value $A(x2)$, is used as an alternative data piece $B(x1)$ on the target sampling point. A similar correction process may be performed on each of the other sampling points, whereby an alternative data array removed of the spike-like noises is obtained, as indicated by ○ in FIG. 14.

While the embodiment is described by way of the example where the median value of the sample values for three successive sampling points including the target sampling point is determined, the invention is not limited to this. Alternatively, the correction process may be performed based on sample values for five sampling points in total, which include the target sampling point and the next two preceding sampling points and the next two succeeding sampling points. A correction process for the foundation, in particular, may be performed using a relatively wide range of sample values because the foundation is inherently of a consistent nature and free from a density gradient like that of the patch image It.

In the following description, individual sampled data pieces are represented by the same reference characters accompanying those of the aforementioned density control process. Specifically, outputs from the density sensor Vp, Vs at individual sampling points x (x=0, 1, 2, . . . ) on the foundation are expressed as $Tp1(x)$ and $Ts1(x)$, respectively. Furthermore, outputs from the density sensor at individual points x in the patch image It are expressed as $Dp1(x)$ and $Ds1(x)$, respectively. Corrected values given as a result of the above correction process on the sample values $Tp1(x)$, $Ts1(x)$, $Dp1(x)$ and $Ds1(x)$ are expressed as $Tp2(x)$, $Ts2(x)$, $Dp2(x)$ and $Ds2(x)$, respectively. For example, the corrected value $Dp2(x)$ is an alternative date piece given by performing the above correction process on the sample value $Dp1(x)$ for the sampling point x in the patch image It. That is, the corrected value $Dp2(x)$ is equal to a median value of three sample values $Dp1(x-1)$, $Dp1(x)$ and $Dp1(x+1)$. Each of the other corrected values may be considered similarly.

Returning to FIG. 11 again, the tone control process is described further. Subsequently, an evaluation value for each of the points in the patch image It is calculated, the evaluation value indicating a density of the patch image at the point of interest (Step S24). Essentially the same calculation as those of the aforementioned density control process may be used. In the following description, an evaluation value for the position x will be expressed as $Gt1(x)$.

Similarly to the density-control patch image Iv, the tone-control patch image It may also encounter the occurrence of the periodical variations of the density. In the density-control patch image Iv, the influences of such density variations are cancelled by averaging the evaluation values for the points in the image on the assumption that the patch image inherently has the constant image density. However, the tone-control patch image It inherently has the density gradient associated with the variations of tone level. In addition, the patch image requires the determination of a discrete image density per point. Therefore, the same method cannot be used for canceling the periodical density variations. On this account, the tone control process of the embodiment performs a different correction process from that of the density control process, thereby eliminating the influences of the density variations (Step S25).

In a case where the developing roller 44 has eccentricity, the rotation of the developing roller entails periodical density variations. In an image forming apparatus of a contact development system wherein a development process is performed with the developing roller 44 pressed against the photosensitive member 22, contact pressure between these elements is varied due to the eccentricity of the developing roller 44. Hence, the percentage of toner transfer from the developing roller 44 to the photosensitive member 22 is also varied. On the other hand, in an image forming apparatus of a non-contact development system wherein the development process is performed with the developing roller 44 spaced away from the photosensitive member 22 via a gap therebetween, an electric field produced at the gap is varied in intensity so that toner jump performance is varied. In the apparatuses of either systems, therefore, the eccentricity of the developing roller 44 entails the variations of image density.

Inconsistencies of a toner layer formed over the developing roller 44, such as inconsistent amounts of toner carried on the developing roller 44 and inconsistent electric charges of the toner, also constitute causative factors of the density variations. This is because if the amount of toner carried on the developing roller 44 or the electric charge amount of the toner is varied, the amount of toner transferred to the photosensitive member 22 will be varied from place to place. Such variations of toner transfer may result not only from inconsistent surface conditions of the developing roller 44 such as associated with mechanical variations occurring in the production process or with the toner fixedly adhered to the surface of the developing roller, but also from the apparatus which is allowed to stand with the developing roller 44 at standstill over an extended period of time.

In the formation of the patch image It according to the embodiment, the header image portion Ih, as a solid image, is formed prior to the formation of the gradation image portion Ig serving for the purpose of collecting data used for controlling the tone correction characteristics of the apparatus. The header image portion Ih has a length along the direction D2 which is the circumferential length Ldr of the developing roller or more. Therefore, the header image portion Ih of the patch image It is formed using the toner carried on the surface of the developing roller 44 prior to the formation of the patch image. Then, the fresh toner from the developer is supplied to the surface of the developing roller 44 where the toner is thus consumed. Since the header image portion Ih is the solid image, the toner on the overall circumferential surface of the developing roller 44 is substantially uniformly consumed. Accordingly, the fresh toner carried on the surface of the developing roller 44 has a high degree of evenness along the circumferential direction of the roller.

On the other hand, the gradation image portion Ig is formed using the fresh toner supplied to the developing roller 44, the toner having the high degree of evenness. Hence, the image forming apparatus is less likely to suffer the density variations associated with the inconsistent toner layer over the developing roller 44. It is therefore possible to determine the tone characteristics of the apparatus with high accuracies based on the detected densities of the gradation image portion Ig.

According to the embodiment thus arranged, the patch image It is provided with the header image portion Ih which has the length of the circumferential length Ldr of the developing roller or more. Thus, the embodiment is adapted to prevent the gradation image portion Ig from being affected by the density variations resulting from the inconsistencies of the toner carried on the surface of the developing roller 44. In some cases, however, the influences of the density variations associated with the other causative factors such as the aforesaid eccentricity of the developing roller 44 may not be fully eliminated.

The variations of the image density caused by such a defect of the developing roller 44 repeatedly appear in synchronism with the period of rotation of the developing roller 44. Accordingly, it is possible to reduce the influences of the density variations by correcting the sampled data taking advantage of the periodicity of the density variations. It is noted here that attention should be paid to the following point. In a case where the developing roller 44 and the photosensitive member 22 rotated relative to each other are moved at an equal surface speed, a period of the image density variations on the photosensitive member 22 has a length equal to the circumferential length of the developing roller 44. However, in a case where these elements are moved at different surface speeds, the period of the image density variations on the photosensitive member 22 is either longer or shorter than the circumferential length of the developing roller 44 in accordance with a speed ratio between these elements.

The embodiment moves the developing roller 44 and the photosensitive member 22 at an equal speed. Therefore, the variations of the image density appear in cycles corresponding to the circumferential length of the developing roller 44. The following description is made on two embodiments of a correction process for reducing the influences of such periodical variations, namely, Period Correction 1 and Period Correction 2.

Figure 15:
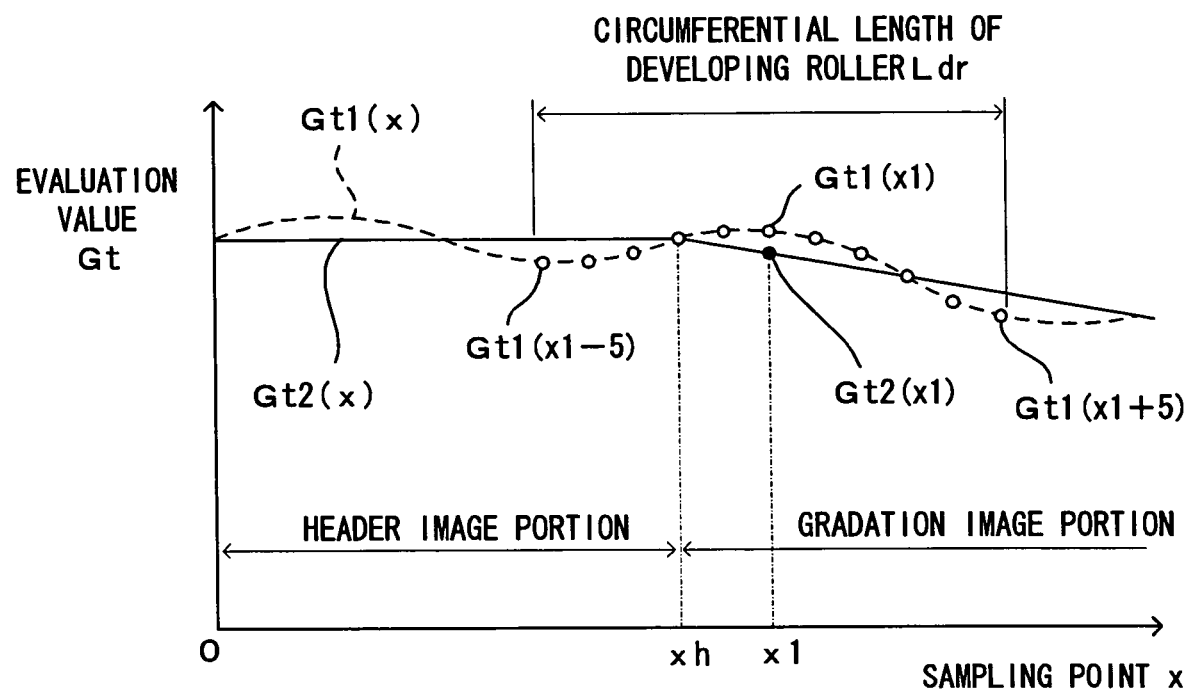
FIG. 15 is a graph explanatory of the principles of the period correction 1.

FIG. 15 is a graph explanatory of the principles of the period correction 1. In the period correction 1, the variations appearing in cycles corresponding to the circumferential length Ldr of the developing roller are cancelled by performing the following smoothing process on the previously determined evaluation values for the individual points in the patch image It.

As indicated by the solid line in FIG. 15, the evaluation value for the patch image It should be substantially constant at the sampling points ($0 \leq x \leq xh$) equivalent to the header image portion Ih. On the other hand, the evaluation values for the sampling points (x>xh) equivalent to the gradation image portion Ig should be progressively decreased with the decrease of the tone level. Because of the density variations of the patch image It associated with the developing roller 44, however, the results of the previously calculated evaluation values $Gt1(x)$ (indicated by ○) are also periodically varied in correspondence to the circumferential length Ldr of the developing roller. Hence, such periodical variations of the evaluation value are canceled by performing the correction process 1 as follows. In the period correction 1, an evaluation value $Gt1(x)$ for a target sampling point is replaced by a mean value $Gt2(x)$ which is calculated from evaluation values for some sampling points included in the range of the circumferential length Ldr of the developing roller and symmetrically located with respect to the subject sampling point. FIG. 15 illustrates an example where 11 sampling points are included in the range of the circumferential length Ldr of the developing roller. For instance, a corrected value Gt2($x1$) (indicated by ● in FIG. 15) for a sampling point ($x=x1$) is expressed as follows:

$$Gt2(x1)=\{Gt1(x1-5)+Gt1(x1-4)+\ldots+Gt1(x1)+\ldots+Gt1(x1+4)+Gt1(x1+5)/11\} \quad \text{(Equation 5)}$$

It is noted here that Gt1($x1-5$), Gt1($x1-4$), . . . individually represent an evaluation value for the fifth preceding sampling point, the fourth preceding sampling point, . . . to the subject sampling point.

The smoothing process is a processing technique generally known as "the moving average process". The smoothing process based on the moving average processing permits the fluctuations contained in the continuous sample data array to be smoothed. In this embodiment, the range of the sampled data used by the process corresponds to the circumferential length Ldr of the developing roller. Therefore, the influences of the periodical density variations occurring in conjunction with the rotation of the developing roller 44 can be cancelled.

It is noted that the smoothing process based on the moving average processing has a problem that a sharp fluctuation of the data is reduced. In the tone patch image It of the embodiment, however, the tone level of the gradation image portion Ig is successively varied. Therefore, only the opposite ends of the gradation image portion Ig may involve the problem. Of these ends, a leading end having the maximum tone level is directly preceded by the header image portion of the solid image, so that the evaluation value for the leading end fluctuates moderately. Since the evaluation values are progressively decreased to zero with decrease of the tone level, the evaluation value for the trailing end does not fluctuate sharply either. By virtue of the patch image It composed as the image including the header image portion Ih having the maximum tone level, and the gradation image portion Ig continuous to the trailing end of the header image portion Ih and progressively varied in the tone level from the maximum level to the minimum level, the reduced fluctuation of the data, which results from the smoothing process, may be obviated.

In a case where a required number of sampled data pieces succeeding the trailing end of the gradation image portion Ig are not available, the smoothing process may be performed on the neighborhood of the trailing end using a suitably changed number of data pieces. Where there are only N data pieces (N representing a natural number of less than 10) succeeding that for the subject sampling point, for example, the smoothing process may be performed using a total number of (2N+1) data pieces, which include the data piece for the subject sampling point and a respective set of N preceding data pieces thereof and N succeeding data pieces thereto.

Figure 16:
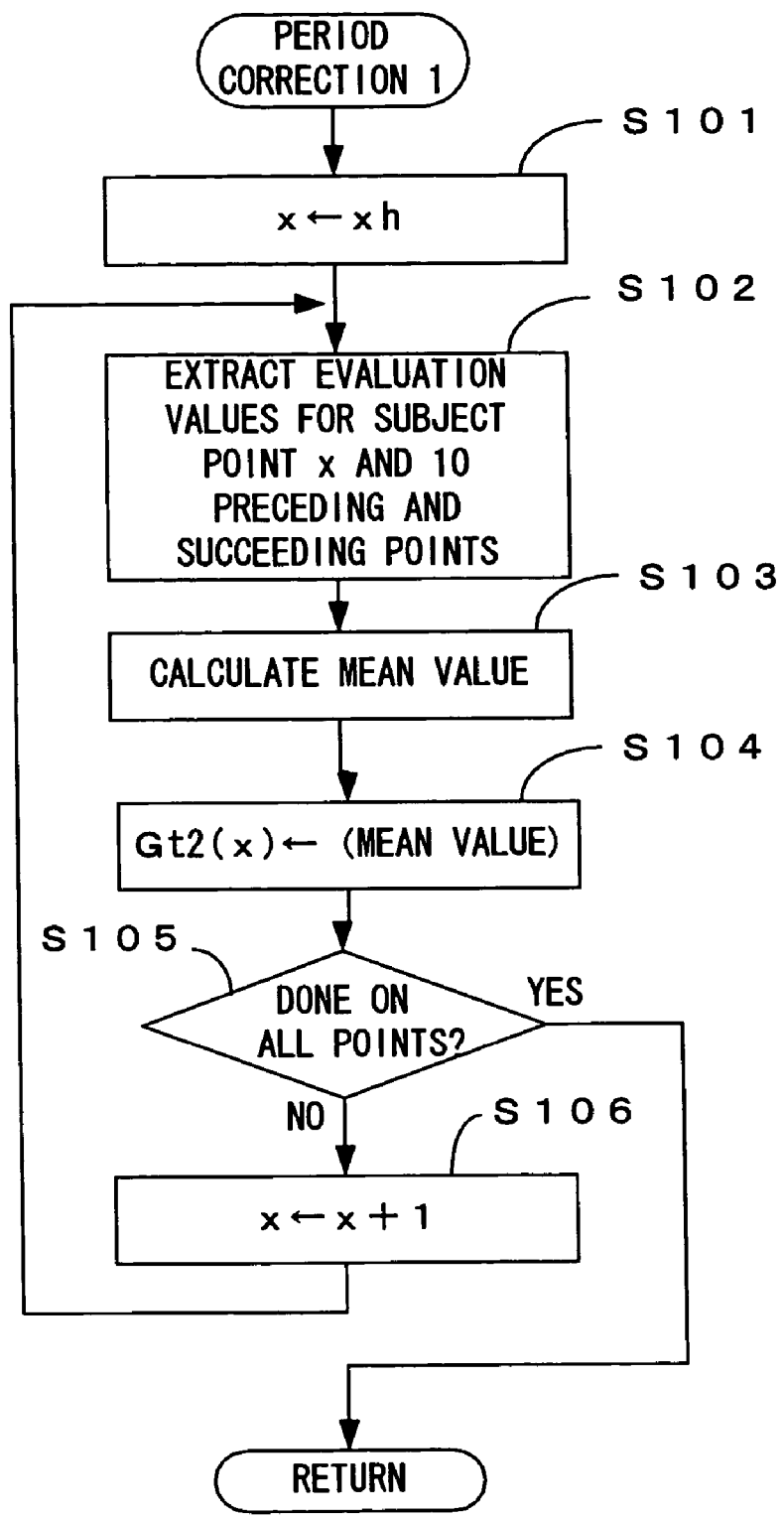
FIG. 16 is a flow chart representing the steps of the period correction 1.

FIG. 16 is a flow chart representing the steps of the period correction 1. In this embodiment, the moving average processing is performed using 21 sampled data pieces because 21 sampling operations are actually performed during a time period corresponding to the circumferential length Ldr of the developing roller. Specifically, provided that the process is started from a sampling point ($x=xh$) (Step S101), there are extracted evaluation values for a total number of 21 sampling points which include the starting point, 10 preceding points thereof and 10 succeeding points thereto (Step S102). A mean value of these evaluation values is calculated (Step S103). The mean value thus determined is used as a corrected evaluation value Gt2($x$) for the starting position (Step S104). This process is repeated as shifting the position x until data on all the sampling points in the gradation image portion Ig are corrected (Steps S105, A106). Thus are obtained the alternative evaluation values Gt2($x$) removed of the periodical variations caused by the developing roller 44.

Thus, the sampling results of the header image portion Ih are used in a data processing related to the neighborhood of the leading end of the gradation image portion Ig, whereas the sampling results of the points rearward of the trailing end of the patch image It are used in a data processing related to the neighborhood of the trailing end of the gradation image portion. As described above, the processings entail less reduction of the data fluctuation. Therefore, the period correction 1 can provide accurate calculations of the evaluation values as canceling the influences of the periodical variations caused by the developing roller 44, the evaluation values indicating the image densities at the individual tone levels ranging from the maximum level to the minimum level. In a case where a corrected value Gt2($x$) for the header image portion Ih ($0 \leq x \leq xh$) is required, a mean value of the evaluation values Gt1($x$) for the individual points in the header image portion Ih may be used as the corrected value Gt2($x$) for the individual points in the header image portion. This is because the header image portion Ih should inherently have the constant image density.

Figure 17:
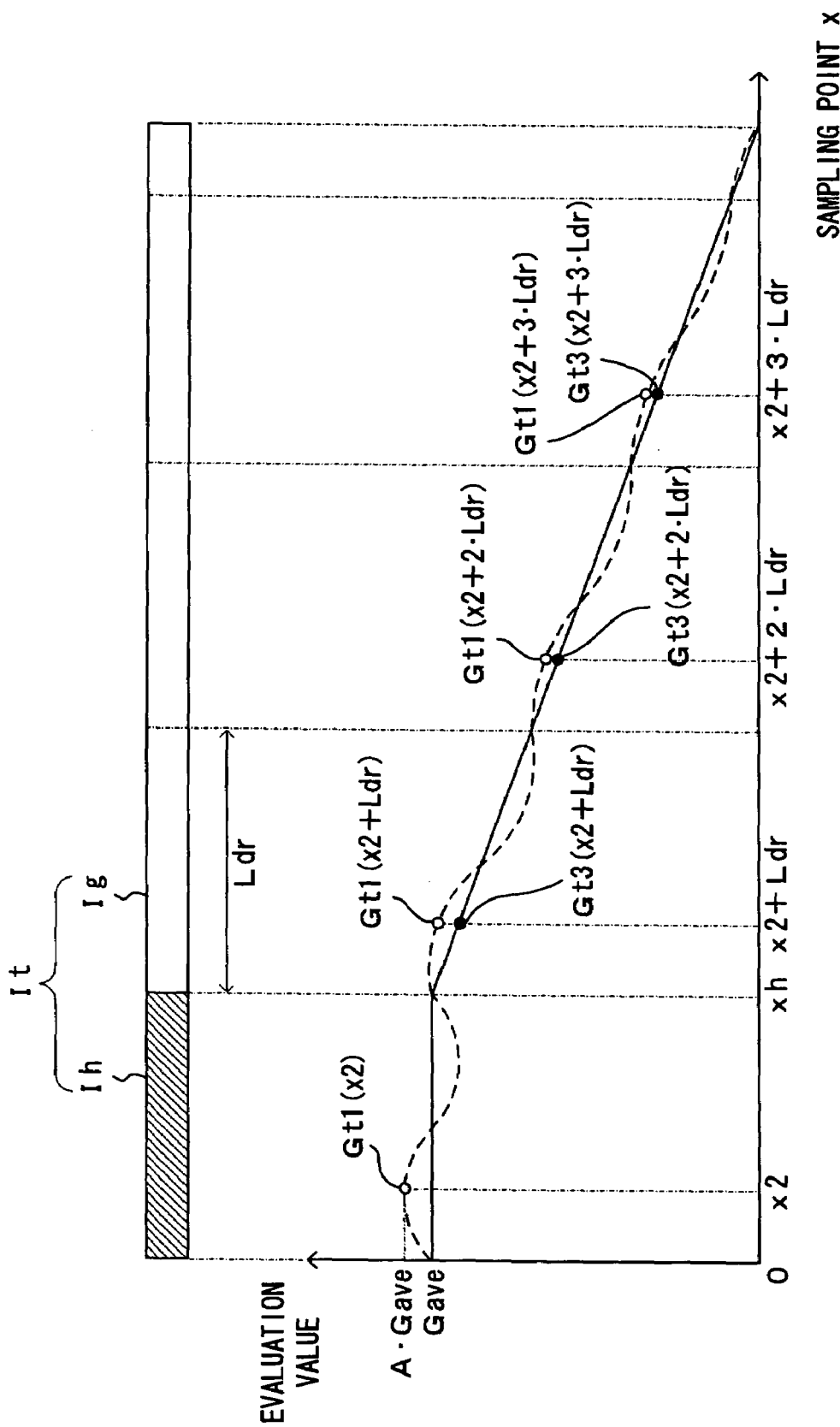
FIG. 17 is a graph explanatory of the principles of the period correction 2.
Figure 18:
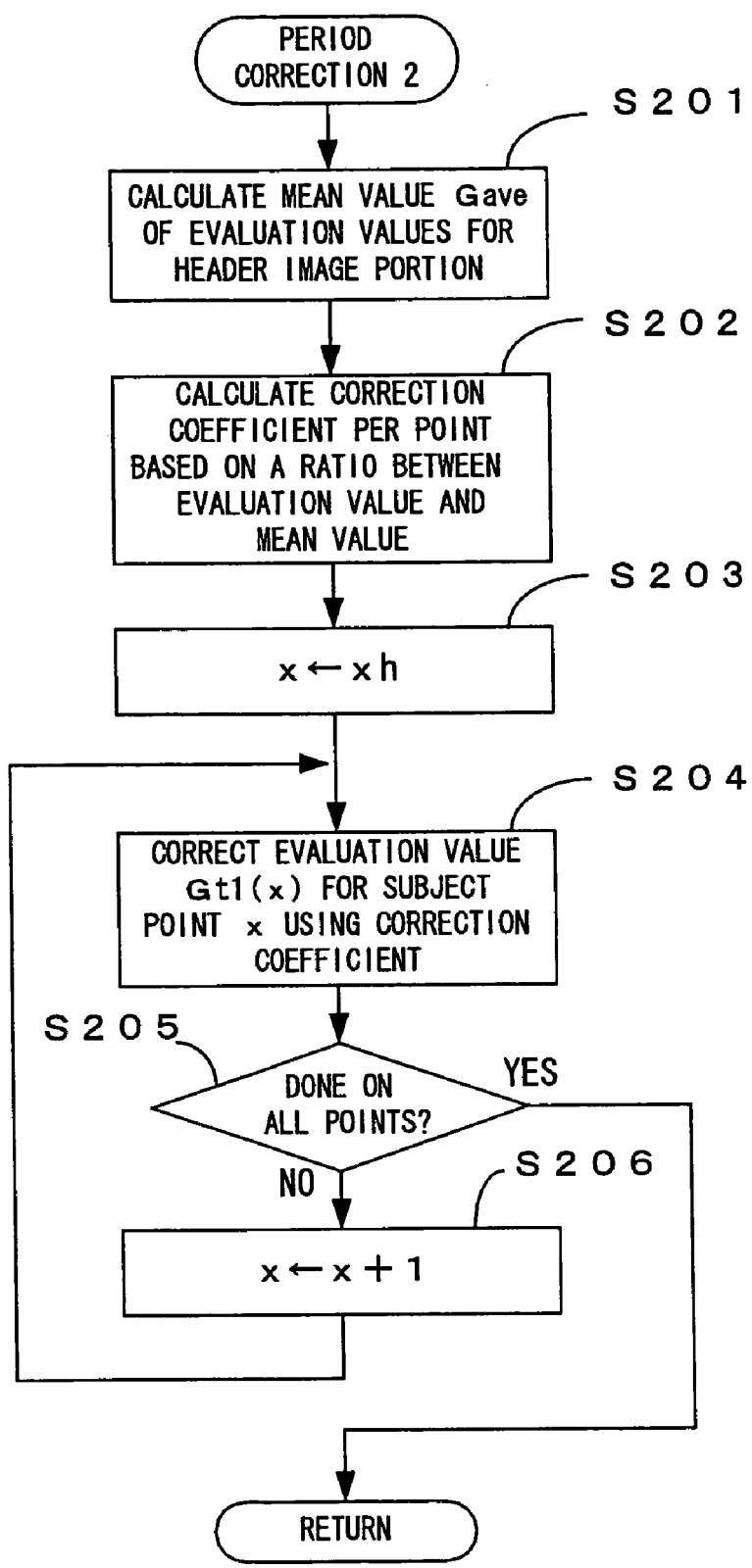
FIG. 18 is a flow chart representing the steps of the period correction 2.

Next, referring to FIGS. 17 and 18, description is made on a second embodiment of the correction process for removing the influences of the periodical density variations caused by the developing roller 44.

FIG. 17 is a graph explanatory of the principles of the period correction 2. FIG. 18 is a flow chart representing the steps of the period correction 2. The period correction 2 removes the periodical variations of the evaluation value corresponding to the circumferential length Ldr of the developing roller as follows. The frequency of the density variations appearing in the patch image It is determined from the sampling results of the header image portion Ih. The frequency thus determined is used for correcting the detected densities of the gradation image portion Ig. Specifically, the correction is performed in the following manner.

First, a mean value Gave of the evaluation values Gt1($x$) for the individual sampling points in the header image portion Ih is determined. The mean value Gave is equivalent to an evaluation value for the header image portion Ih free from the periodical variations. Then, a ratio of the evaluation value Gt1($x$) for the sampling point versus the mean value Gave is determined for each of the sampling points in the header image portion Ih. Assume that an evaluation value Gt1($x2$) for a sampling point ($x=x2$) is greater than the mean value Gave by a factor A, for example. That is, Gt1($x2$)=A·Gave. This indicates that the evaluation value Gt1($x2$) for this point is increased from its inherent value Gave by the factor A due to the influences of the density variations.

If the evaluation value varies in a period corresponding to the circumferential length Ldr of the developing roller, the same variation as the above should also appear at a point ($x=x2+$Ldr) rearward from the above point by one circumferential length of the developing roller 44. Namely, an evaluation value Gt1($x2+$Ldr) for this point should be increased from its inherent value by the factor A. Therefore, the evaluation value Gt1($x2+$Ldr) for this point may be corrected using the following equation (Equation 6), thereby to obtain a corrected value Gt3($x2+$Ldr) free from the influences of the density variations:

$$Gt3(x2+Ldr)=G1(x2+Ldr)/A \quad \text{(Equation 6).}$$

As to an evaluation value Gt1($x2+$N·Ldr) for a point ($x=x2+$N·Ldr) rearward from the sampling point ($x=x2$) by N times the circumferential length of the developing roller 44 (N representing a natural number), the evaluation value for this point may also be divided by the factor A, thereby to obtain a corrected value $Gt3(x2+N \cdot Ldr)$.

As to an evaluation value for any one of the other sampling points in the gradation image portion Ig, as well, the correction may be performed based on a ratio between the evaluation value $Gt1(x2)$ for its corresponding point in the header image portion Ih and the mean value Gave, whereby the evaluation value for the subject point is removed of the periodical variations.

A specific processing method is described with reference to FIG. 18. First, the mean value Gave of the evaluation values $Gt1(x)$ for the individual points in the header image portion Ih is calculated (Step S201). Then, a ratio of the evaluation value $Gt1(x)$ for the sampling point versus the mean value Gave is determined for each of the points in the header image portion Ih. A correction coefficient for the subject point is determined based on the ratio thus determined (Step S202). The above example directly uses the ratio determined by the preceding step as the correction coefficient on the assumption that the image densities at points individually corresponding to a given position on the developing roller 44 vary at the same ratio. However, the correction coefficient may be determined by any other suitable method.

The correction process is started from a point (x=xh) (Step S203). An evaluation value $Gt1(x)$ for the subject point is corrected using a correction coefficient determined for its corresponding point in the header image portion Ih, whereby an alternative evaluation value $Gt3(x)$ is obtained (Step S204). This process is repeated as shifting the point x until the evaluation values for all the sampling points in the gradation image portion Ig are corrected (Steps S205, S206). Thus are obtained alternative evaluation values $Gt3(x)$ removed of the periodical variations caused by the developing roller 44.

Both of these two periodical-variation correction process can remove the periodically varied components from the evaluation data. In order to acquire the data for use in these correction processes and to suppress the density variations occurring in the gradation image portion Ig, it is desirable to form the header image portion Ih prior to the formation of the gradation image portion Ig, header image portion having a length of the circumferential length Ldr of the developing roller or more.

Thus, the influences of the periodically varied image densities associated with the rotation of the developing roller 44 may be reduced by performing the correction process in the range corresponding to the circumferential length Ldr of the developing roller. This purpose may be satisfied by forming the header image portion Ih in a length equal to or greater than ½ of the circumferential length Ldr of the developing roller. In order to form the gradation image portion Ig sustaining even less density variations, the embodiment defines the length of the header image portion Ih to be the circumferential length Ldr of the developing roller or more, so that the gradation image portion Ig may be formed with the fresh toner supplied to the developing roller 44.

Next, description is made on a reverse correction process (Step S26) performed subsequent to the aforementioned periodical-variation correction process and in the tone control process of FIG. 11. The reverse correction process is for the purpose of removing the influences of the noises left unremoved in either of the above correction processes. The reverse correction process corrects a sequence $\{Gt2(x)\}$ of the evaluation values $Gt2(x)$ for the individual sampling points x into a monotonously decreasing sequence. In stead of performing the reverse correction process directly on the output voltages from the density sensor 60, the embodiment performs the reverse correction process on the "evaluation values" calculated based on the density information and the subjected to the aforesaid correction. However, the corrected evaluation values are mere numerical values replacing the output voltages from the density sensor 60, the numerical values representing a parameter as more direct indication of the image density. Accordingly, the same concept may be applied to cases where the correction process is applied to the output voltages from the density sensor 60 or other density information items. The following description is an explanation of the correction process performed on the evaluation value.

First, three examples of the correction process are illustrated as below for explaining the principles of the process. Then, the contents of the correction process according to the embodiment are described. The following explanation refers to an example where the correction is performed on the sequence $\{Gt2(x)\}$ of the evaluation values $Gt2(x)$ which are corrected by the period correction 1 mentioned above. In a case where the periodical variations are corrected by the period correction 2, the reverse correction process may be performed the same way using a sequence $\{Gt3(x)\}$ of the evaluation values $Gt3(x)$ which are corrected by the period correction 2.

Figure 19:
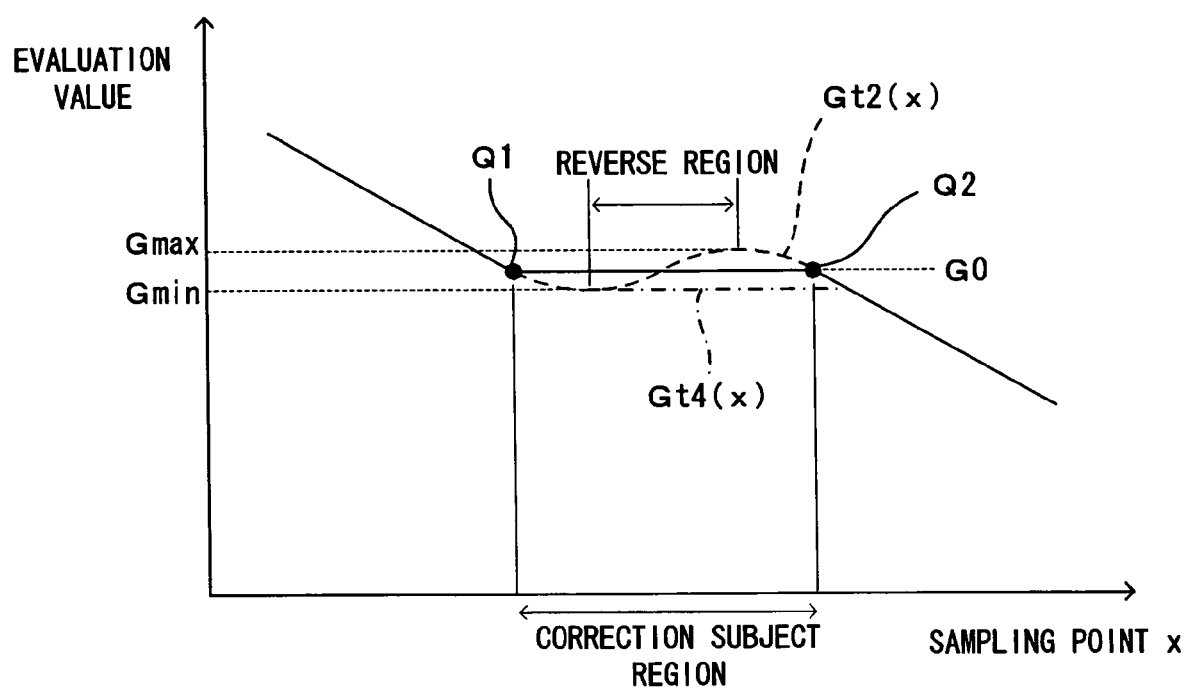
FIG. 19 is a graph explaining the principles of the first example of the reverse correction process.
Figure 20:
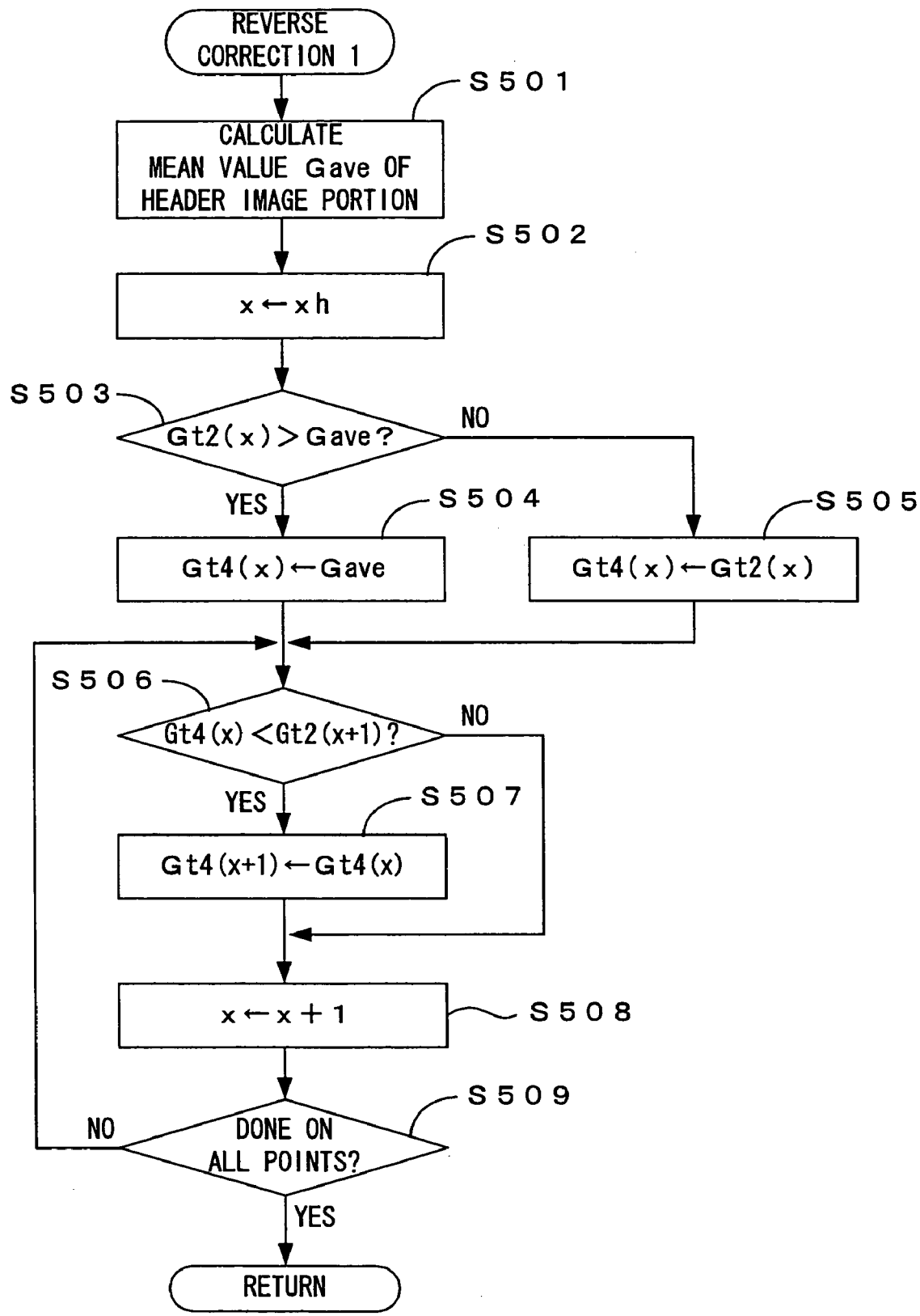
FIG. 20 is a flow chart representing the steps the first example of the process.
Figure 21:
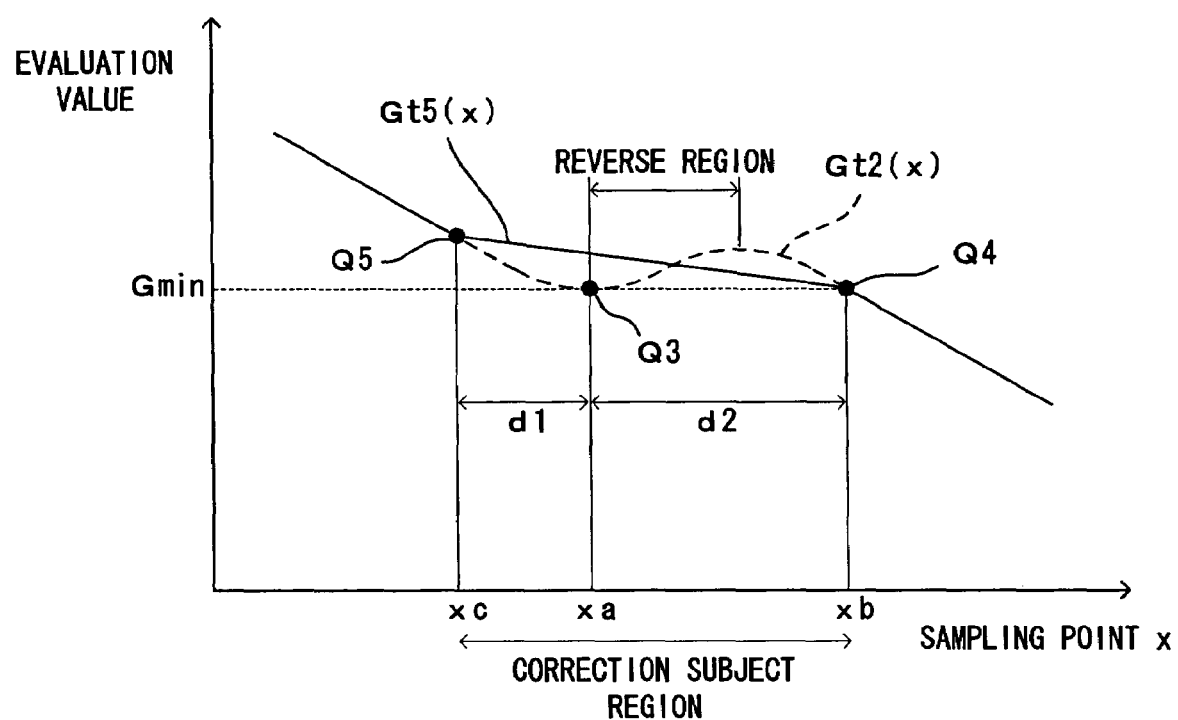
FIG. 21 is a graph explaining the principles of the second example of the reverse correction process.
Figure 22:
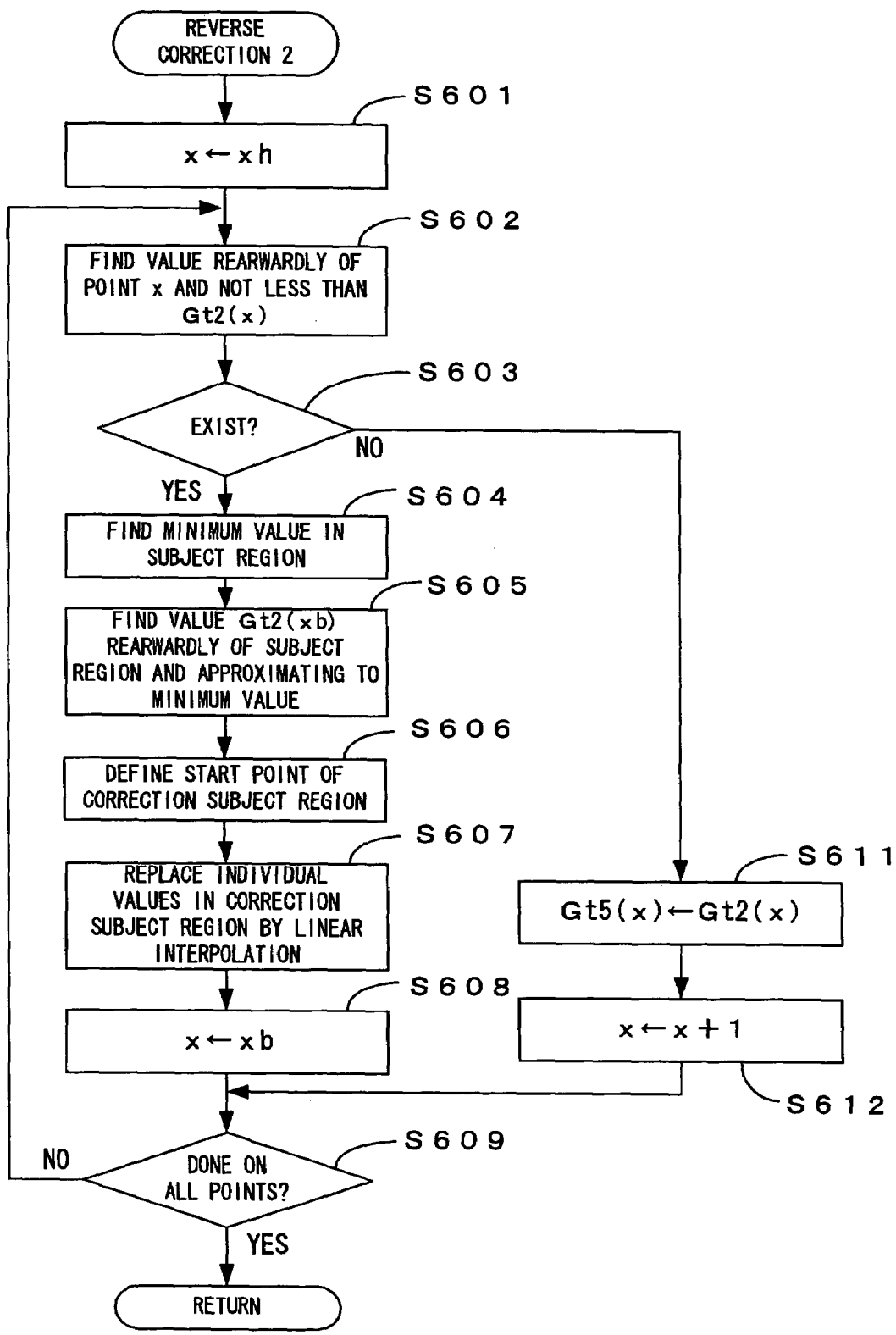
FIG. 22 is a flow chart representing the steps the second example of the process.
Figure 23:
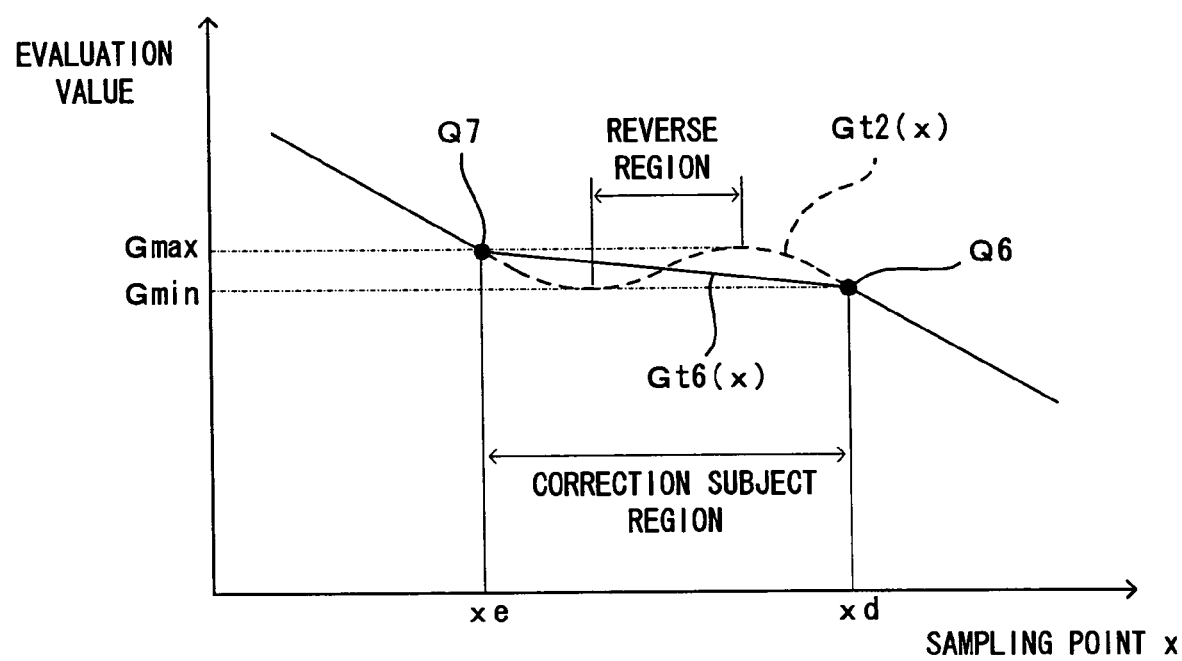
FIG. 23 is a graph explaining the principles of the third example of the reverse correction process.
Figure 24:
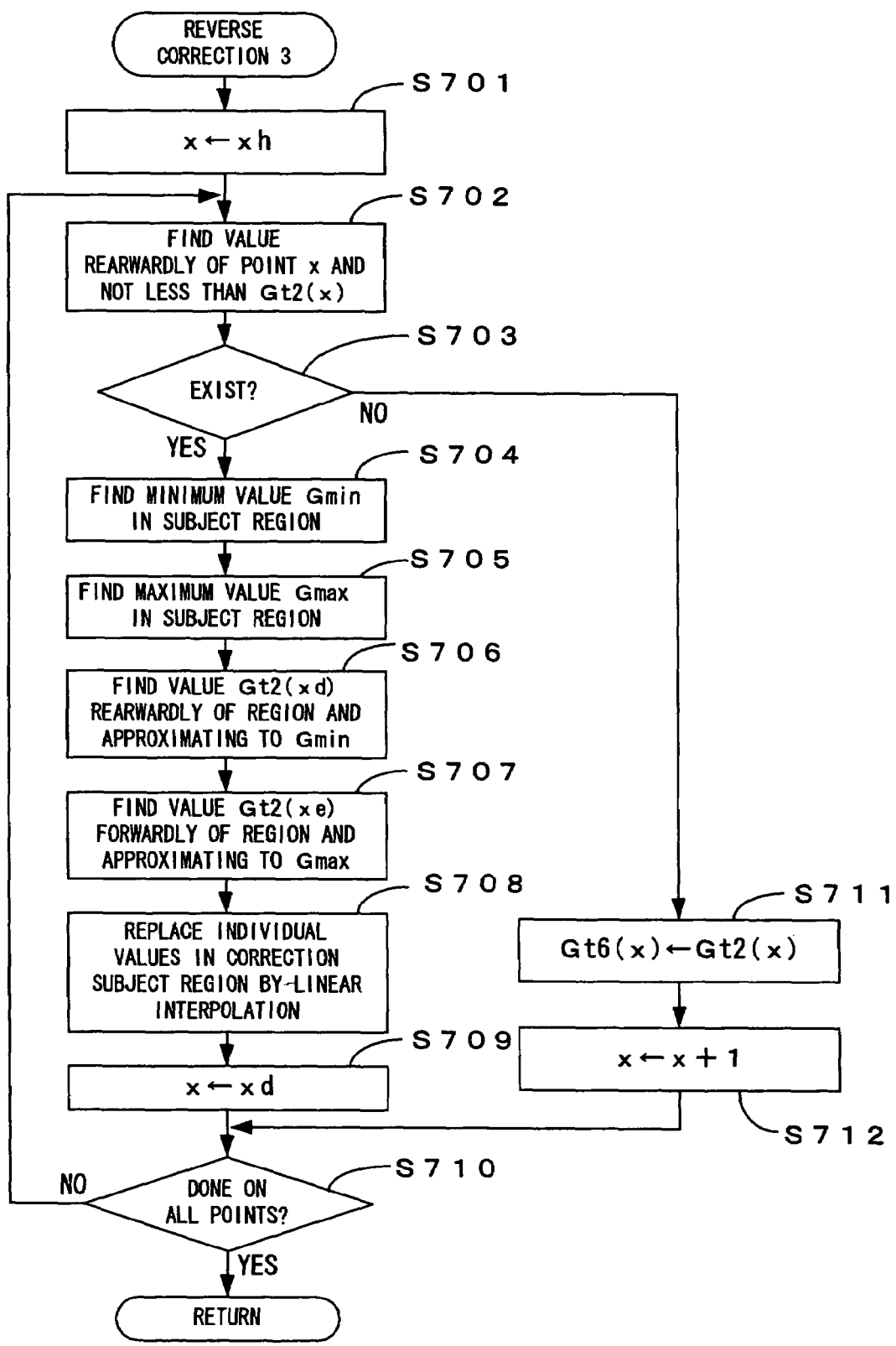
FIG. 24 is a flow chart representing the steps the third example of the process.

FIGS. 19, 21 and 23 are graphs explaining the principles of the first through third examples of the reverse correction process, respectively. FIGS. 20, 22 and 24 are flow charts representing the steps the first through third examples of the process, respectively. In these figures and the following description, the evaluation values $Gt2(x)$ are schematically expressed as a continuous function of a variable x. Since the variable x can take only discrete values, as mentioned supra, the sequence $\{Gt2(x)\}$ of the actual evaluation values $Gt2(x)$ can be defined as a result given by sampling the above continuous function at proper intervals. In the interest of easy comprehension, the following description will use, as required, the evaluation values $Gt2(x)$ expressed as the continuous function instead of the discrete sequence $\{Gt2(x)\}$. In the following description, a curve obtained by plotting the evaluation value $Gt2(x)$ against the function x will be referred to as "evaluation-value curve".

The first example of the process (hereinafter, referred to as "reverse correction 1") illustrates a process for eliminating a reverse region in which, as shown in FIG. 19, the evaluation value $Gt2(x)$ increases against the regularity of the function $Gt2(x)$ that the evaluation value $Gt2(x)$ should monotonously decrease with the increase of the function x. The exemplary process is particularly useful in a case where the sequence $\{Gt2(x)\}$ is a monotonously decreasing sequence in a broad sense or permits the existence of a flat region. In the patch image It of the embodiment (FIG. 12), for example, the header image portion Ih formed with the tone level maintained at the maximum level 255 and having the predetermined length is provided at the leading end portion of the image. Thus, the header image portion should have the constant image density. Namely, the sequence $\{Gt2(x)\}$ is a monotonously decreasing sequence in the broad sense which permits the existence of the flat region.

A specific correction method is described as below. In a case where the function $Gt2(x)$ contains the reverse region, a certain correction subject region including the reverse region is defined. The correction subject region may be defined based on the following concept, for example. First, a minimum value Gmin and a maximum value Gmax in the reverse region are determined. Next, a straight line at an angle of zero is drawn at place corresponding to any proper value G0 greater than the minimum value Gmin and less than the maximum value Gmax. Then, there are determined points Q1, Q2 at which the straight line is intersected by the evaluation-value curve Gt2(x) externally of the reverse region. A region between these points Q1 and Q2 is defined as the "correction subject region".

In the correction subject region thus defined, all the evaluation values Gt2(x) are replaced by the value G0 so as to provide a flat region. Thus, the reverse of the function Gt2(x) is eliminated. In a case where there is another reverse region, such a reverse region may be eliminated the same way.

Referring to the flow chart of FIG. 20, a specific procedure of the reverse correction 1 applied to the embodiment is described. The flow chart illustrates a correction process wherein the start point Q1 of the correction subject region is matched with a start point of the reverse region. Namely, the correction is performed with the minimum value Gmin of the reverse region set at the aforesaid correction value G0 so as to provide the correction results as indicated by a dot-and-dash line in FIG. 19.

In the reverse correction 1, a mean value Gave of the evaluation values Gt2(x) for the individual sampling points in the header image portion Ih of the patch image It is determined (Step S501). Next, the variable x is set to a value xh (Step S502). As shown in FIG. 12, the value xh represents the coordinate of a sampling point corresponding to the leading end of the gradation image portion Ig of the patch image It. Then, the evaluation value Gt2(x) for this sampling point is compared with the mean value Gave of the header image portion Ih (Step S503). If the evaluation value Gt2(x) exceeds the mean value Gave, this mean value Gave is used as a corrected value Gt4(x) for the sampling point (Step S504). This is because the image header image portion Ih has the highest image density in the patch image It and hence, an image density exceeding this mean value at any position but for the header image portion is regarded as abnormal. If, on the other hand, the evaluation value Gt2(x) is below the mean value Gave of the header image portion, the value Gt2(x) is directly used as the corrected evaluation value Gt4(x) (Step S505).

Subsequently, the corrected evaluation value Gt4(x) for the sampling point as the current correction subject is compared with an evaluation value Gt2(x+1) for the next succeeding sampling point (Step S506). If the evaluation value Gt2(x+1) is greater than Gt4(x), or these sampling points are included in the reverse region, Step S507 is executed to use the same value as the corrected evaluation value Gt4(x) for the sampling point as the current subject as a corrected evaluation value Gt4(x+1) for the next succeeding point. As a result, the corrected evaluation value Gt4(x) and the corrected evaluation value Gt4(x+1) are equalized so that the reverse region is converted into a flat region. If, on the other hand, there is no reversal phenomenon, the process flow skips Step S507.

Subsequently, the variable x is incremented (Step S508) and the aforementioned processing (Steps S506 to S508) is repeated in cycles until the correction is done on all the sampling points in the patch image It (Step S509). Thus is obtained a corrected sequence {Gt4(x)} wherein the reverse region included in the original sequence {Gt2(x)} is converted into the flat region. The resultant sequence {Gt4(x)} is the monotonously decreasing sequence in the broad sense.

In the second exemplary process (hereinafter, referred to as "reverse correction 2"), the reverse region is eliminated by replacing a correction subject region including the reverse region of the function Gt2(x) with a monotonously decreasing sequence in a narrow sense. Specifically, the correction is performed as follows. If there exists the reverse region, a minimum value Gmin in such a region is first determined. A point taking the minimum value Gmin is defined as a point Q3. Next, a point Q4 is found, which is located rearwardly of the reverse region (or in a region having greater values of x than the reverse region) and which has a value of the function Gt2(x) equal to the aforesaid minimum value Gmin (or a value most approximating to but less than Gmin).

A distance d2 between the points Q3 and Q4 with respect to the abscissa is determined. Then a point Q5 is found, which is located forwardly of the point Q3 (a region of x values smaller than that of the point Q3) by a distance d1 with respect to the abscissa, the distance d1 having a predetermined ratio against the distance d2 (e.g., d1:d2=1:2). The point Q5 thus determined and the point Q4 are interconnected by a straight line to define the "correction subject region". In the correction subject region, a corrected function Gt5(x) is monotonously decreased so that the reverse region is eliminated.

According to the above description of the reverse correction 2, the processing is performed on the function Gt2(x) including the reverse region, in which the value of the function Gt2(x) increases with the increase of the variable x. Now, discussion is made on a case where the function Gt2(x) includes a flat region. Since the flat region is not the aforesaid reverse region, the aforementioned correction process is not applied to the flat region. That is, the flat region is maintained as it is. In this case, the correction of the function Gt2(x) provides a monotonously decreasing function in the broad sense.

On the other hand, in a case where the function does not permit the existence of the flat region, or the correction of the function should provide a monotonously decreasing function in a narrow sense, the flat region must be corrected, as well. In this embodiment, for example, the gradation image portion Ig of the patch image It should have the image densities monotonously decreased in the narrow sense.

The following procedure may be taken to correct the flat region into a monotonously decreasing region in the narrow sense. Where the function Gt2(x) includes the flat region, the opposite end points of the flat region, or the points having the greatest value of x and the smallest value of x in the flat region are defined as the aforesaid point Q3 and Q4. Then the point Q5 is found the same way as described above. The points Q5 and Q4 are interconnected by a straight line whereby the flat region is eliminated.

In short, the correction process 2 is adapted to correct the function to provide the monotonously decreasing functions in both the broad sense and the narrow sense. In addition, the correction process permits selection between the correction subject region consisting of the "reverse region" exclusive of the flat region, and the correction subject region defined by a "non-decreasing region" inclusive of the flat region.

A more specific procedure of the reverse correction 2 applied to the embodiment is described with reference to FIG. 22. The reverse correction 2 converts the sequence {Gt2(x)} into the monotonously decreasing sequence {Gt5(x)} in the narrow sense. Similarly to the reverse correction 1, the variable x is first set to a value xh corresponding to the leading end of the gradation image portion Ig of the patch image It (Step S601). Then, a check is made for a sampling point which is located rearwardly of the sampling point as the current subject (x=xh) and having an evaluation value greater than the evaluation value Gt2(x) for the current subject point (Step S602).

The fact that the value greater than the evaluation value Gt2(x) is present rearwardly of the current subject point means that the flat or reverse region exists rearwardly of the current subject point. If such a value exists, a data replacement process including the following steps S604 to S607 is executed. Otherwise, these steps are skipped (Step S603) and the evaluation value Gt2(x) is directly used as a corrected evaluation value Gt5(x) (Step S611). In this example, the data replacement is performed when the value of at least the "current evaluation value" exists, or when the flat or reverse region exists. In a case where the existence of the flat region is permitted, as described above, the value of at least the current evaluation value may be re-defined as the value exceeding the current evaluation value.

The data replacement process is performed as follows. First, a minimum evaluation value Gmin is found in a previously found flat or reverse region (Step S604). While a sampling point taking the minimum value Gmin is equivalent to the point Q3 shown in FIG. 21, the coordinate thereof is expressed as xa. Next, a sampling point is found, which is located rearwardly of this region and has a value most approximating to the minimum value Gmin (but not exceeding the minimum value Gmin). The coordinate of the point thus found is expressed as xb (Step S605). This point is equivalent to an end point Q4 of the correction subject region.

Next, a start point Q5 of the correction subject region is determined (Step S606). Provided that the coordinate of the start point of the correction subject region is expressed as xc, the coordinate thereof is defined by the following equation:

$$(xa-xc):(xb-xa)=d1:d2 \qquad \text{(Equation 7)}$$

The evaluation values Gt2(x) for the individual sampling points included in the correction subject region [xc,xb] thus determined are individually replaced by values Gt5(x) given by linear interpolation based on a straight line interconnecting the two points Q5 and Q4 (Step S607). Thus, the values in the correction subject region monotonously decrease so that the flat or reverse region is eliminated.

Then, the coordinate xb corresponding to the end point Q4 of the correction subject region is used as an alternative set value for the variable x (Step S608) and the above process is repeated in cycles until the correction is done on the values for all the sampling points in the patch image (Step S609). Where the above steps S604 to S607 are skipped, the variable x is incremented by 1 (Step S612) and the above process is repeated in cycles. Thus is obtained a sequence of the evaluation values Gt5(x) monotonously decreasing across the gradation image portion Ig of the patch image It.

Next, description is made on the third exemplary process (hereinafter, referred to as "reverse correction 3"). In the reverse correction 3, as well, the reverse region is eliminated by replacing the correction subject region including the reverse region of the function Gt2(x) with the monotonously decreasing function in the narrow sense, as shown in FIG. 23. However, this example takes a different method from that of the aforementioned reverse correction 2. Where there exists the reverse region, the reverse correction 3 determines a minimum value Gmin and a maximum value Gmax in the reverse region. In addition, there are found a point Q6 which is located rearwardly of the reverse region and has a value equal to the minimum value Gmin (or a value most approximating to Gmin but not exceeding Gmin), and a point Q7 which is located forwardly of the reverse region and has a value equal to the maximum value Gmax (or a value most approximating to and greater than Gmax). A region between these points Q6 and Q7 are defined as the "correction subject region". A straight line interconnecting these points eliminates the reverse region, thus providing the monotonously decreasing function Gt6(x) in the narrow sense.

A more specific procedure of the reverse correction 3 applied to the embodiment is described with reference to FIG. 24. Out of the individual steps of the reverse correction 3, steps S701 to S704 are the same as Steps S601 to S604 of the reverse correction 2 and hence, the description thereof is dispensed with. In the subsequent step S705, the maximum evaluation value Gmax is found in the previously found flat or reverse region.

Based on the minimum value Gmin and the maximum value Gmax thus found, a correction subject region is defined. First, a sampling point located rearwardly of the flat or reverse region and having a value most approximating to the minimum value Gmin (but not exceeding the minimum value Gmin) is found, and the coordinate thereof is expressed as xd (Step S706). This point corresponds to the end point Q6 of the correction subject region. Next, a sampling point located forwardly of the flat or reverse region and having a value most approximating to the maximum value Gmax is found, and the coordinate thereof is expressed as xe (Step S707). This point corresponds to the start point Q7 of the correction subject region.

In the reverse correction 3 shown in FIG. 24, the processing is performed with the subject sampling point shifted from the left side toward the right side as seen in FIG. 23. It is therefore when the coordinate x of the current subject point reaches xe that the step S702 detects the presence of the flat or reverse region rearwardly of the subject sampling point. In this example, when the existence of the flat or reverse region is determined by checking some sampling point, the sampling point checked at this point of time automatically coincides with the start point Q7 of the correction subject region. Accordingly, when Step S702 detects the existence of the reverse region, the start point of the correction subject region may be defined by the current value of the variable x.

After the correction subject region is defined, the values in the subject region may be replaced the same way as in the reverse correction 2 (Step S708). Similarly to the reverse correction 2, with the variable x updated (Step S709), the above process is repeated in cycles until the process is done on the overall patch image (Step S710). In a case where a value exceeding the current evaluation value does not exist rearwardly of the current subject point, the same processing as that of the reverse correction 2 may be performed. In this manner, the original sequence {Gt2(x)} including the flat or reverse region may be replaced by a monotonously decreasing sequence {Gt6(x)}.

By performing any one of the three correction processes mentioned above, the sequence of the corrected evaluation values is converted into the monotonously decreasing sequence in either the broad sense or the narrow sense. In a case where the original sequence is the monotonously decreasing sequence in the narrow sense, any one of the correction processes naturally provides the corrected sequence which is identical with the original sequence.

Returning to FIG. 11, the tone control process is described further. To put it exactly, the "density" of the patch image represented by the evaluation value indicates the amount of toner forming the image, as mentioned supra. Therefore, the density of the patch image is not the same as a density of an image on the sheet S as the result of transferring and fixing the patch image to the sheet S. The reason is given as below. In the patch image formed on the intermediate transfer belt 71, toner particles forming the image are simply adhered to the intermediate transfer belt 71 by means of an electrostatic force. In the image fixed onto the sheet S, on the other hand, the toner is fused to the sheet S. Because of the different conditions of the toner forming such images, the detected density of the toner image temporarily carried on the intermediate transfer belt 71 is not necessarily the same with the density of the final image on the sheet S.

The final object of the tone correction is to achieve the highest quality of the image formed on the sheet S. For achieving this object, it is desirable to decide the contents of the tone correction process based on fed-back results of the density detection of the patch image fixed on the sheet S. However, this approach is impracticable. This is because forming the patch image on the sheet S for this purpose leads to an additional consumption of the sheet S. What is more, there occurs a need for providing additional means for detecting the density of the patch image fixed to the sheet S. In the image forming apparatuses, such as copiers and multi function apparatuses, which are equipped with a scanner for reading an original document, the scanner may be used to serve this purpose. However, the sheet S formed with the patch image need be transported to place to be read by the scanner.

In this connection, the image forming apparatus takes the following approach. That is, the apparatus utilizes previously determined "transferring/fixing characteristics" thereof for converting the detected density (evaluation value) of the patch image on the intermediate transfer belt 71 into the image density (optical density: OD value) on the sheet S, thereby providing a practical feed-back of the image density on the sheet S to the tone correction process. Specifically, as shown in FIG. 11, the previously determined evaluation value $Gt4(x)$ or the like for the patch image on the intermediate transfer belt 71 is converted into an OD value on the sheet S (Step S27). The OD value is fed back to the tone-correction table operation section 119. The tone-correction table operation section 119, in turn, performs a predetermined operation so as to update the contents of the tone correction table 118 in a manner to match the tone level represented by the input image signal with the actual tone level of the image on the sheet S (Step S28). In this manner, the tone control process may be performed to update the tone correction table 118 on an as-required basis, thereby ensuring that images of good quality are formed in a stable manner irrespective of the varied characteristics of the apparatus.

The "transferring/fixing characteristics" mean a quantitative representation of a relation between the value indicating the amount of toner forming a given toner image as determined on the intermediate transfer belt 71 (although the value is equivalent to the "evaluation value" of the embodiment, the value may be the sampled data per se, for example) and the density (optical density) of the toner image fixed to the sheet S.

Figure 25:
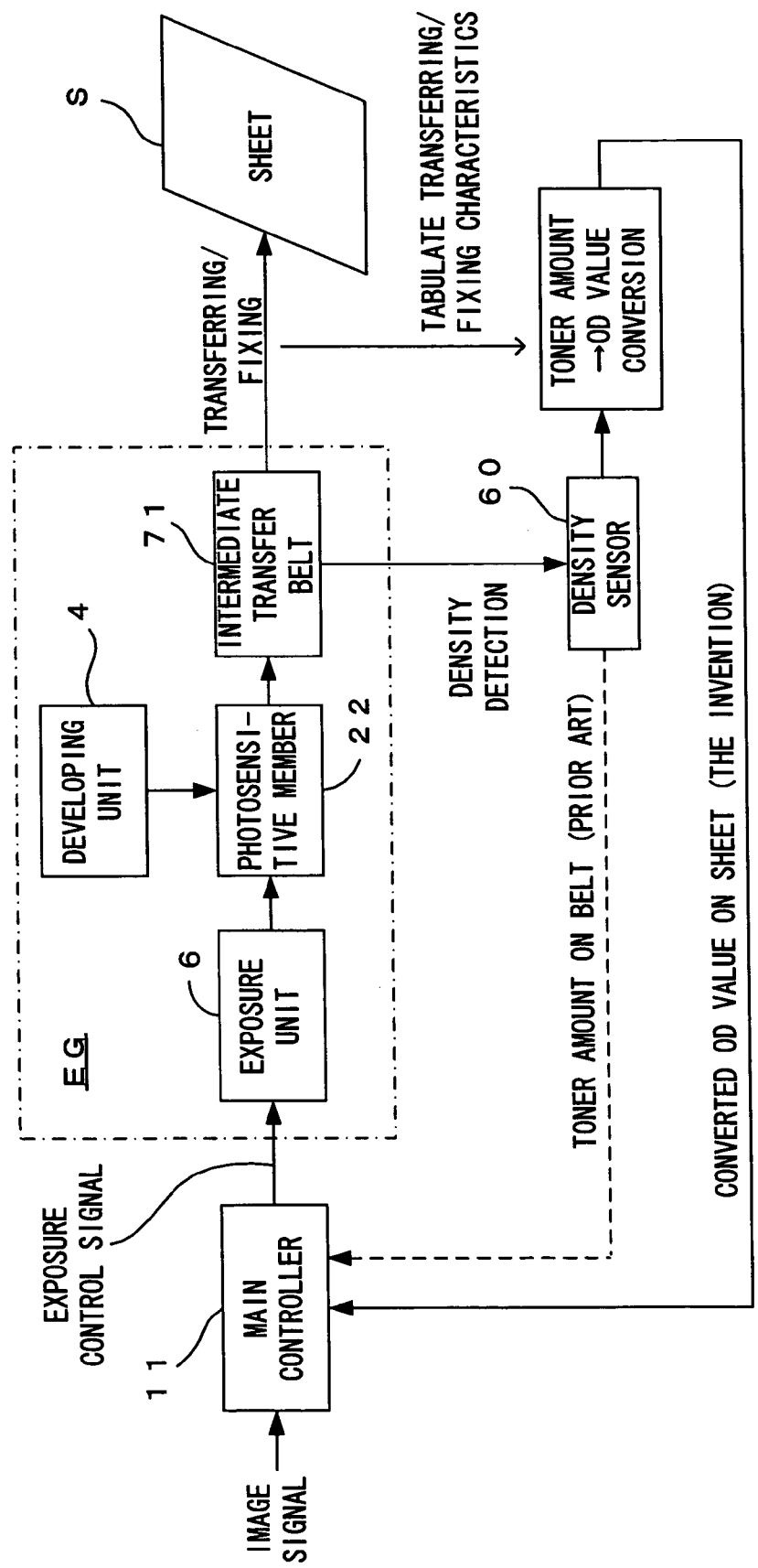
FIG. 25 is a block diagram explanatory of the principles of the tone correction process.

FIG. 25 is a block diagram explanatory of the principles of the tone correction process performed by the image forming apparatus. As described in the foregoing, the image forming apparatus performs predetermined signal processes including the tone correction on the image signal applied from the external apparatus by means of the main controller 11. The signal thus processed into an exposure control signal is applied to the exposure unit 6 via the engine controller 10. Based on the signal thus applied, the exposure unit 6 forms the electrostatic latent image on the photosensitive member 22. The electrostatic latent image is visualized as the toner image by means of the developing unit 4. The resultant toner image is transferred to the intermediate transfer belt 71 and then, transferred and fixed onto the sheet S.

The density sensor 60 detects the density (exactly, the amount of toner) of the patch image carried on the intermediate transfer belt 71. In the conventional tone correction technique for the image forming apparatus, the amount of toner on the intermediate transfer belt 71 as detected by the density sensor is fed back to the main controller as indicated by the broken line in FIG. 25. In other words, the conventional tone correction technique is designed to correct the engine gamma for so far as the intermediate transfer belt. Such a technique does not consider the performance of transferring and fixing the image from the intermediate transfer belt to the sheet and hence, is incapable of providing correction for the difference between the amount of toner on the intermediate transfer belt and the image density on the sheet. Consequently, the images on the sheets do not always have the highest quality.

In contrast, the embodiment is arranged such that the amount of toner on the intermediate transfer belt 71, as detected by the density sensor 60, is converted into the OD value on the sheet S and then, is fed back to the main controller 11. The fed-back value is substantially equivalent to an image density detected on the sheet S and fed back to the main controller 11. The embodiment permits the main controller 11 to perform the tone control process wherein both the gamma characteristic of the engine EG and the image transferring/fixing characteristics from the intermediate transfer belt to the sheet S are integrally corrected. As a result, the embodiment ensures that the images formed on the sheets S have the highest quality.

Specifically, an OD-value conversion table 124 including tabulated transferring/fixing characteristics is provided in the engine controller 10, as shown in FIG. 5. The tone characteristic calculator 123 refers the amount of toner of the patch image (evaluation value), as determined from the output from the density sensor 60, to the table 124, thereby determining a corresponding OD value. It is desirable that plural sets of OD-value conversion tables 124 are previously provided so that any one of the conversion tables may be selected according to the operation history of the apparatus. The reason is given as below.

FIG. 26 is a graph representing an example of the transferring/fixing characteristics. As seen in FIG. 26, the transferring/fixing characteristics can be expressed as a characteristic curve on coordinates of the toner amount on the intermediate transfer belt (evaluation value) against the OD value on the sheet. The curve of transferring/fixing characteristics varies depending upon the operation history of the apparatus. For instance, a particle size distribution or chargeability of the toner in the developer differs between a state where the developer contains therein a sufficient amount of toner (solid line) and a state where the developer is decreased in the amount of remaining toner (broken line). Such a difference results in the variations of the curve of transferring/fixing characteristics. In addition, the curve of transferring/fixing characteristics may be varied according to the degree of deterioration of the photosensitive member 22 or the developing roller 44.

The following problem may result from the curve of transferring/fixing characteristics varied depending upon the operation history of the apparatus. Even though a constant amount of toner is detected from the toner image on the intermediate transfer belt 71, the image density as the result of fixing the toner image to the sheet S may be varied depending upon the operation history of the apparatus. According to the example of FIG. 26, when a patch image on the intermediate transfer belt 71 has an evaluation value G1, the image density of the patch image fixed to the sheet S varies from OD1 to OD2 depending upon the amount of toner remaining in the developer. Therefore, if the process for converting the evaluation value to the OD value is always performed on the same basis, the process cannot cope with the variations of the transferring/fixing characteristics. This results in the problem that the image fixed onto the sheet S suffers instable image quality.

In this connection, there are previously provided plural options for the OD-value conversion table on the assumption that the transferring/fixing characteristics vary according to the operation history of the apparatus. In the conversion from the evaluation value to the OD value, a conversion table considered to be optimum from the current operation history of the apparatus may be selected from the options and be referred to. Thus, the above problem is solved. Alternatively, there may be previously provided only one type of table, the contents of which may be updated, as required, according to the operation history of the apparatus.

As an index based on which the operation history of the apparatus is assessed, there may be adopted the operation time of the photosensitive member 22 or the operation time of the developer besides the aforesaid amount of remaining toner in the developer. With the same amount of remaining toner, the characteristics are varied by the deterioration of the toner. Hence, the rotation time of the developing roller 44 may also be used as a parameter indicating the degree of deterioration of the toner. Furthermore, these parameters may be used in combination.

Alternatively, the degree of deterioration of the apparatus may be determined based on the detected density of a test image formed under particular image forming conditions. The detected density of at least some of the aforesaid patch images may also be used for this purpose.

According to the embodiment, the detected amount of toner of the patch image on the intermediate transfer belt 71, as determined from the output signal from the density sensor 60, is converted into the image density (OD value) on the sheet S with reference to the previously prepared conversion table. Based on the conversion result, the contents of the tone correction process are decided. Accordingly, the tone correction is performed to correct the gamma characteristics of the overall apparatus, the characteristics including the characteristics of the engine EG alone and the transferring/fixing characteristics to the sheet S. As a result, the image forming apparatus can improve the quality of the image on the sheet S.

The technical concept that the detected amount of toner on the intermediate transfer medium such as the intermediate transfer belt is converted into the image density on the recording material before committed to the tone correction may also be applied to the conventional tone correction technique wherein the patch images are formed at a limited number of tone levels.

The OD-value conversion table 124 is updated according to the operation history of the apparatus, thereby retaining its correspondence to the transferring/fixing characteristics varied according to the operation history of the apparatus. This ensures that the apparatus can achieve the high image quality in a stable manner regardless of the aging thereof.

The embodiment can also afford the following working effects by virtue of the arrangement wherein the output from the density sensor 60 is converted into the OD value on the sheet by means of the engine controller and thereafter, the converted value is sent to the main controller 11. The image density (OD value) defined on the sheet S is a value which is unconditionally determined from light reflectivity or the like with respect to the sheet S. Hence, the OD value does not depend upon the configuration of the apparatus responsible for the image formation. Thus, the data independent from the hardware configuration of the apparatus are fed back from the engine EG and hence, the contents of the signal process performed by the main controller 11 may be decided regardless of the hardware configuration of the apparatus. This not only provides the simplified contents of the process performed by the main controller 11, but also permits the same contents of signal process to be applied to an apparatus including an engine of a different configuration. As a result, the invention contributes to the reduction of costs for the development of apparatus and the maintenance thereof. In a case where the detected amount of toner on the intermediate transfer belt 71 is directly fed back to the main controller 11, on the other hand, the contents of the signal process by the main controller 11 must be changed according to the configuration of the apparatus because the detected amount of toner varies depending upon the characteristics of the used toner or of the density sensor.

Figure 27:
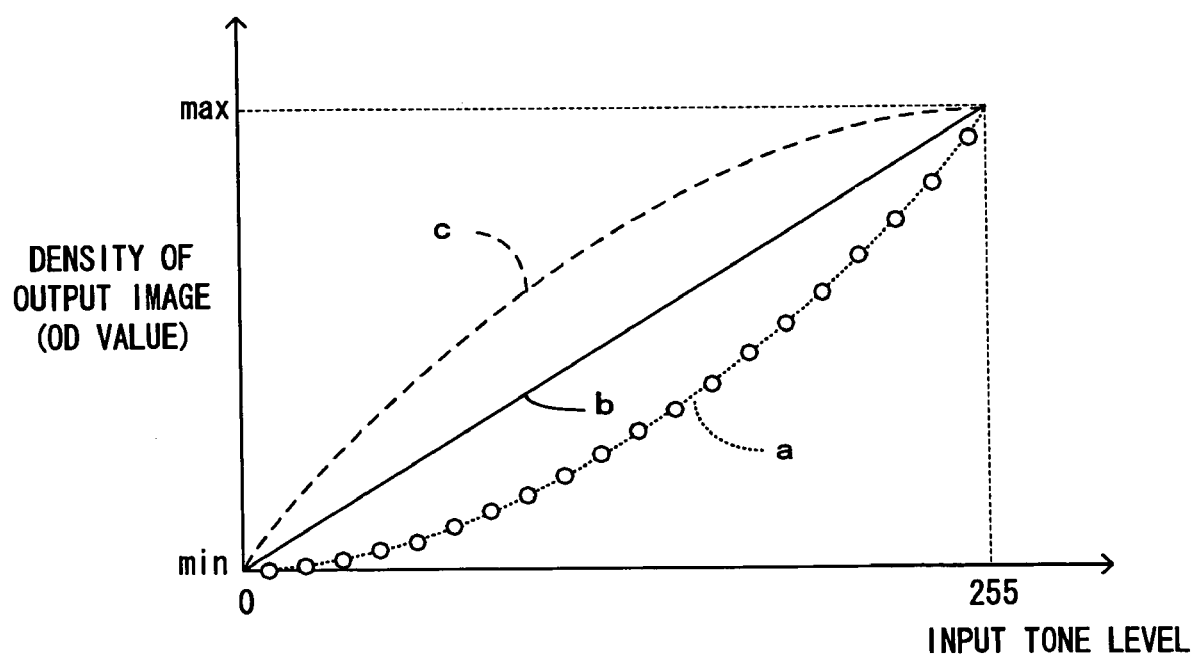
FIG. 27 is a graph illustrating the tone characteristics of the engine and the corrected characteristics.

FIG. 27 is a graph illustrating the tone characteristics of the engine and the corrected characteristics thereof. The optical density OD value is calculated for each of the points in the tone patch image It, as described above. Plotting the calculated OD values against the input tone levels provides a curve as exemplified by the curve a shown in FIG. 27. The curve represents the tone characteristics of the apparatus, or the relation between the tone level of the image as derived from the input image signal and the optical density of the image actually formed on the sheet S. Because of differences among individual apparatuses, time-related variations and changes in the ambient conditions, the tone characteristics based on the measurements may not coincide with idealistic tone characteristics which are desirable in principle (such as represented by a curve b in FIG. 27). On this account, the image signal may be previously subjected to tone correction based on the inverse of the aforesaid tone characteristics obtained from the measurements, as indicated by a curve c in FIG. 27 for example. This permits the formation of an image which faithfully reproduces the tone characteristics of the input image signal.

Specifically, the tone-correction table operation section 119 calculates tone-correction table data for obtaining the idealistic tone characteristics by compensating for the measured tone characteristics of the engine EG based on the tone characteristics supplied from the tone characteristic calculator 123. Then, the correction table operation section updates the contents of the tone correction table 118 to the calculation results. In this manner, the tone correction table 118 is re-defined.

If, in this process, the measured tone characteristic data on the apparatus are affected by the noises or density variations, the tone-correction table data calculated based on the above data are also deviated from the inherent values. As a result, an image having an unnatural tone is formed. In contrast, the embodiment does not entail such a problem because the tone characteristic data are previously corrected to form the monotonously decreasing sequence and then used for the calculation.

In the subsequent image forming operations, the input CMYK data for each pixel sent from the color converter 114 are corrected with reference to the tone correction table 118 thus updated. A high-quality image featuring excellent tone may be formed by carrying out the image formation based on the corrected CMYK data. In this manner, the tone correction table 118 may be updated on an as-required basis, thereby ensuring that an idealistic tone correction is always provided according to the time-varying gamma characteristics of the engine EG. In consequence, the image having a consistent quality may be formed.

A variety of proposals have heretofore been made on the operation method for updating the tone correction table. The embodiment may also apply any of these methods to the tone correction. It is noted, however, that there is a case where the detected densities (evaluation values) of the gradation image portion Ig should not be regarded as absolute image densities corresponding to the individual tone levels.

Figure 28:
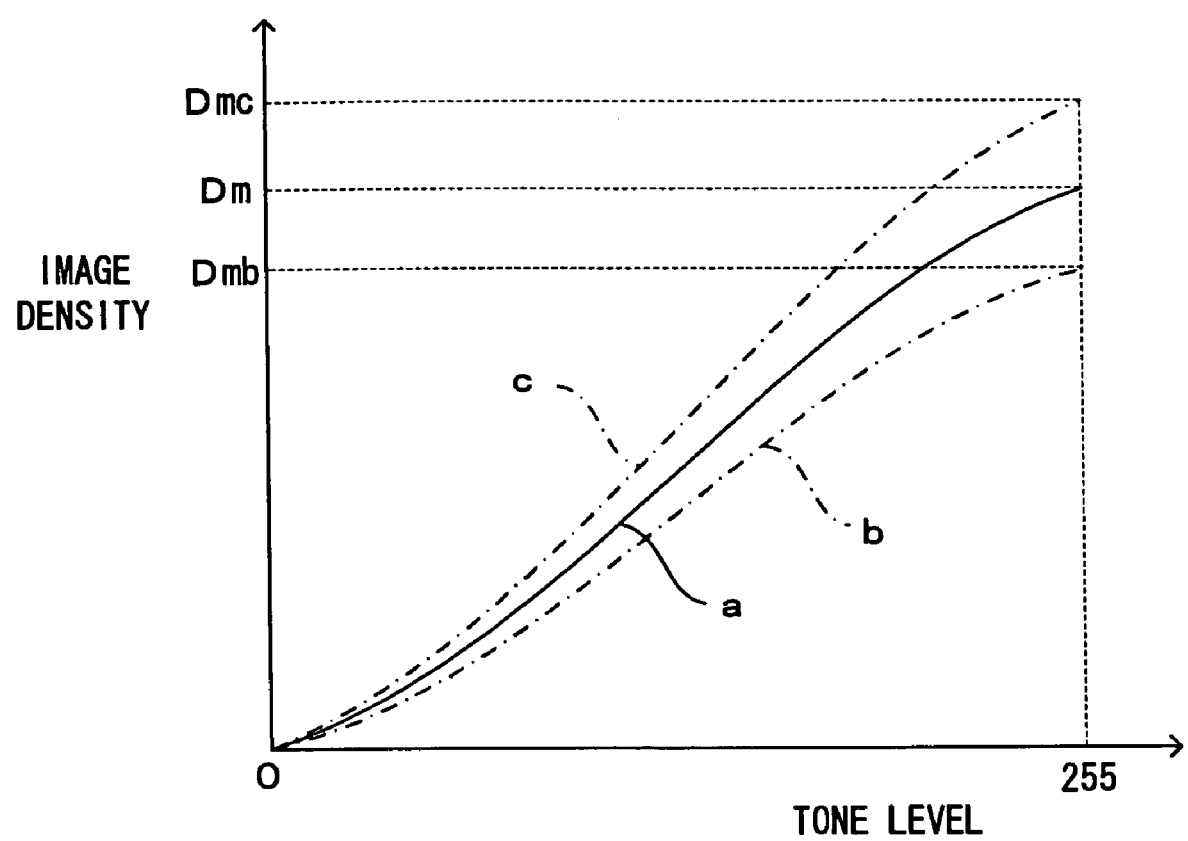
FIG. 28 is a graph representing the relation between the tone level and the image density.

FIG. 28 is a graph representing the relation between the tone level and the image density. In an idealistic state where each of the density control factors is set to its optimum value, an image (solid image) formed at the maximum tone level (Level 255) has a designed maximum density Dm, while the image density varies as the tone level varies, as indicated by a curve a in FIG. 28. The curve a represents a tone characteristic curve inherent in the apparatus. Thus, the tone correction table 118 must be updated in a manner to approximate the tone characteristic curve of the apparatus as close as possible to the idealistic curve.

In a state where any one of the density control factors deviates from its optimum value, on the other hand, an image density at the maximum tone level is higher or lower than the designed value Dm. This entails a shift of the image densities at individual tone levels to a higher or lower side, so that a curve different from the inherent tone characteristics is obtained, as indicated by a curve b or c in FIG. 28. An idealistic tone reproduction cannot be achieved by updating the tone correction table 118 based on such a curve.

In this embodiment, the optimization of the density control factors is followed by forming the patch image It including the header image portion Ih, based on which the tone control process is performed. Accordingly, the embodiment can cope with the above problem. Specifically, the density control process is performed to optimize the density control factor. Subsequently, the header image portion Ih is formed and the density thereof is detected in order to determine whether the target density is achieved or not, or whether the density control factor is optimized or not.

The gradation image portion Ig reflects the influences of both the tone characteristics of the apparatus and the image density characteristics appearing depending upon a set value of the density control factor. In contrast, the density of the header image portion Ih is irrespective of the tone characteristics of the apparatus but depends upon the set value of the density control factor. Therefore, the detected density of the header image portion Ih may be used to extract only the contribution of the tone characteristics of the apparatus from the detected density of the gradation image portion Ig. For instance, a value obtained by normalizing the detected density at each point in the gradation image portion Ig based on the detected density of the header image portion Ih indicates a ratio of the detected density at each tone level against the image density at the maximum tone level. The numerical value is free from the influences of the density variations associated with the deviated set value of the density control factor. It is noted that the deviation results not only from improper density control process but also from, for example, the aging of the apparatus.

Alternatively, the following method may be taken. In a case where the results of density detection indicated by the curve b or c in FIG. 28 are obtained, a correction may be made by multiplying the detected density at each tone level by (Dm/Dmb) or (Dm/Dmc), so as to provide a corrected curve represented by the curve a. Thus, the curve indicating the inherent tone characteristics of the apparatus may be obtained irrespectively of the set value of the density control factor. As a matter of course, the same theory holds for a case where the evaluation value is plotted on the ordinate.

That is, the detected densities (or evaluation values) at the individual tone levels per se are not considered to represent the tone characteristics of the apparatus. Instead, the density information representing the tone characteristics of the apparatus is obtained by correcting the detected densities based on the detected density of the solid image portion. The resultant density information provides more accurate determination of the tone characteristics of the apparatus, the determination free from the influences of the deviated set value of the density control factor. Then, the embodiment updates the tone correction table 118 based on the characteristics thus determined, thereby ensuring that the images featuring the excellent tone reproduction are formed in a stable manner.

However, in a case where the detected density (evaluation value) of the header image portion highly accurately coincides with its target value, such a correction is not necessarily performed. In this case, the detected density of the header image portion Ih may be used as a density information piece corresponding to the maximum tone level whereas the detected densities at the individual points in the gradation image portion Ig may be used as density information pieces corresponding to the individual tone levels.

As described above, the image forming apparatus of the embodiment performs the density control process for optimizing the density control factor affecting the image density and the tone control process for controlling the tone characteristics of the apparatus. The patch image It formed in the tone control process is the image including the solid image portion having a predetermined area, and the gradation image portion progressively varied in the tone level. The apparatus determines the tone characteristics thereof based on the detected densities of the solid image portion and the gradation image portion. The apparatus updates the tone correction table for the apparatus based on the tone characteristics thus determined. Taking these procedures, the apparatus can accurately determine the tone characteristics thereof irrespectively of the influences of the somewhat deviated set value of the density control factor. Accordingly, the apparatus can obtain the tone correction characteristics for the image signal, which are properly adapted to the tone characteristics thereof. As a result, the apparatus can form the images with the good tone reproduction in a stable manner.

Furthermore, since the header image portion Ih having the length of the circumferential length Ldr of the developing roller or more is formed, the toner on the whole circumference of the developing roller is consumed prior to the formation of the gradation image portion Ig. Hence, the gradation image portion Ig is formed with the fresh toner supplied to the developing roller 44. Therefore, the gradation image portion Ig is less susceptible to density variations.

Subsequently, the tone correction characteristics of the apparatus are controlled based on the detected densities of the gradation image portion Ig. In this process, the periodical variation correction is performed for correcting the density variations occurring in conjunction with the period of rotation of the developing roller. Therefore, the tone characteristics of the apparatus can be determined accurately.

The header image portion Ih is formed as the solid image having the constant tone level, whereas the gradation image portion Ig is progressively varied in the tone level from the maximum level to the minimum level. Hence, the header image portion Ih is located adjacent the high-tone end of the gradation image portion Ig so that the gradation image portion Ig does not encounter a sharp fluctuation of the image density at the end thereof. Therefore, the detected density of the header image portion Ih may be used to perform the correction process for the periodical variations on the gradation image portion Ig with even higher accuracies.

The detected densities of the patch image It are so corrected as to match the order of the individual values of the data pieces with the inherent order of values (namely, the monotonous decreasing sequence) corresponding to the pattern of the patch image It. Thereafter, the detected densities thus corrected are used for the correction of the tone characteristics. It is thus possible to determine the tone characteristics of the apparatus with high accuracies while reducing the influences of the density variations caused by the noises or characteristic variations.

In addition, the difference between the density of the patch image as detected on the intermediate transfer belt 71 and the image density (OD value) as detected on the sheet S is taken into consideration. The image densities detected on the intermediate transfer belt 71 are converted into the OD values and thereafter, used for the correction of the tone characteristics. It is thus ensured that the image on the sheet S as the final recording material is improved in quality.

The embodiment successively performs the density control process and the tone control process and besides, forms the density-control patch image Iv and the tone-control patch image It at positions partially overlapping each other on the intermediate transfer belt 71. This permits the results of the foundation sampling to be shared by these processes. Therefore, the embodiment achieves the reduction of the process time for the foundation sampling and saves on the memory resource for storing the data.

It is to be noted that the invention is not limited to the foregoing embodiment and various changes and modifications than the above may be made thereto unless such changes and modifications depart from the scope of the invention. According to the foregoing embodiment, for example, the tone-control patch image It has the arrangement wherein the header image portion Ih of the solid image is located at the leading end thereof, and is succeeded by the gradation image portion Ig. In view of a mere convenience for the data processing, however, these image portions may be formed in the reverse order. In this case, it is preferred to form the gradation image portion Ig progressively increased in the tone level, such that the continuity of the tone levels may be provided at a boundary between the gradation image portion Ig and the header image portion Ih. The length of the header image portion is not limited to the above but may be of at least a dimension to permit the accurate density detection. From the standpoint of renewing the toner on the developing roller 44 and of attaining the effect to suppress the influence of the density variations, however, it is more preferred to form the solid image portion Ih prior to the gradation image portion Ig and in the length of the circumferential length Ldr of the developing roller or more.

From the standpoint of merely suppressing the density variations of the gradation image portion Ig by previously consuming the toner on the developing roller by forming the header image portion, the gradation image portion Ig may be formed in the opposite manner to that of the embodiment. That is, the gradation image portion Ig may be progressively increased in the tone level. The reason is that the effect to uniformalize the toner on the developing roller by forming the header image portion is attained regardless of the image pattern of the gradation image portion. When it is considered that the detected density of the header image portion is also used in the correction process for the detected densities of the gradation image portion, however, it is preferred to form the path image in a manner that the image density is continuously varied from the header image portion to the gradation image portion. Hence, it is preferred that the gradation image portion is progressively decreased in the tone level, as illustrated by the embodiment.

While the foregoing embodiment forms the header image portion Ih as the solid image, the image pattern of the header image portion is not limited to this. The header image portion may have another image pattern. In a case where the tones of the gradation image portion start from a tone level other than the maximum level, for example, the header image portion may be of an image having the same tone level as that of the leading end of the gradation image portion. From the standpoint of enhancing the uniformity of the toner supplied to the developing roller subsequent to the formation of the header image portion, however, it is preferred to form an image, as the header image portion, which has the highest possible density and a uniform pattern. In order to use the detected density of the header image portion in the correction process for the detected densities of the gradation image portion, the header image portion may preferably have the uniform image pattern.

Further, the foregoing embodiment performs the period correction 1 or 2 in order to reduce the influence of the periodical density variation of the patch image caused by the eccentricity of the developing roller or the like. However, the periodical variation of the detected density of the patch image may be induced by other reason. For instance, because the photosensitive member 22 and the roller 75 are formed to cylindrical shape, the variation to the detected density of the image occurs in the cause of the eccentricity of these in some cases. Especially, in a case where the roller 75, by which the density sensor 60 is confronted, is driven by the mechanical driver to rotate the intermediate transfer belt, a large fluctuation to detection result by the sensor 60 may be induced. In that case, it is effective to be performed the period correction in which the length of the subject region set to the circumferential length of the photosensitive member 22 or the roller 75.

In the density control process of the foregoing embodiment, the solid image is formed as the patch image Iv, based on which the developing bias as the density control factor is controlled. As mentioned supra, any other operation parameter may be used as the density control factor. The image pattern of the patch image Iv to be formed in the density control process is not limited to the above, and an image of any other suitable image pattern may also be used.

While the foregoing embodiment detects the density of the patch image carried on the intermediate transfer belt 71, the density detection is not limited to this. For instance, the density of the patch image carried on the photosensitive member 22 may be detected. In apparatuses including any other transfer medium than the intermediate transfer belt 71, such as a transfer drum, the density of a patch image carried on such a transfer medium may be detected.

While the foregoing embodiment applies the invention to the apparatus for forming the image using toners of four colors including yellow, magenta, cyan and black, the kind and number of toner colors are not limited to the above but may be decided optionally. The invention is applicable not only to the apparatus of the rotary development system as illustrated by the embodiment, but also to image forming apparatuses of a so-called tandem system wherein the developers corresponding to the individual toner colors are arranged in a line along a sheet conveyance direction. Furthermore, the invention is applicable not only to the electrophotographic apparatus as illustrated by the foregoing embodiment, but also to the all types of image forming apparatuses using toner.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An image forming apparatus comprising:
a latent image carrier that carries an electrostatic latent image on its surface;
a toner carrier rotated in a predetermined direction as carrying a toner on its surface, thereby transporting the toner to an opposing position with respect to the latent image carrier; and
a controller operative to visualize the electrostatic latent image with the toner by transferring the toner carried on the toner carrier to the latent image carrier, thereby forming a toner image, and to control tone correction characteristics of the apparatus based on a detected density of the toner image formed as a patch image,
wherein the patch image includes:
a gradation image portion progressively varied in tone level thereof along a moving direction of a surface of the toner carrier at the opposing position; and
a header image portion formed prior to formation of the gradation image portion and having a length along the moving direction that is a length corresponding to a circumferential length of the toner carrier or more,
and wherein
the header image portion is a solid image having a single tone level,
the controller determines image densities of plural points in the header image portion, and corrects each of the detected densities of the gradation image portion based on the density of the corresponding point as to the circumferential length of the toner carrier, thereby removing periodical density variations from the detected densities of the gradation image portion, and
the gradation image portion is an image varied in the tone level thereof from a maximum level to a minimum level along the moving direction.

2. An image forming apparatus as claimed in claim 1, wherein the controller samples an image density at each of plural sampling points located at mutually different positions in the patch image; performs a smoothing process on a resultant sample data array; and controls the tone correction characteristics based on the results of the smoothing process.

3. An image forming apparatus comprising:
a toner carrier that carries a toner on its surface and rotates in a predetermined direction;
an image forming unit forming a toner image as a density-control patch image as varying a density control factor in multiple steps, the density control factor affecting image density;
a controller determining an optimum value of the density control factor based on detected densities of the density-control patch image thereby controlling the image density;
an image carrier that carries the toner image on its surface; and
a detector outputting a signal corresponding to an image density of a predetermined detection region of the surface of the image carrier, wherein
the controller is designed to sample an output signal from the detector and to determine an image density of the toner image based on a sampling result, the toner image carried on the surface of the image carrier,
the controller determines a density of the toner image based on the sampling result of the toner image carried on the surface of the image carrier and on a sampling result of the surface of the image carrier carrying no toner image thereon,
the image forming unit forms a toner image as a tone-control patch image as setting the density control factor to the optimum value determined by the controller based on the detected densities of the density-control patch image, the tone-control patch image including a solid image portion of a solid image having a predetermined area length along a moving direction of the surface of the toner carrier, the length being a length corresponding to a circumferential length of the toner carrier or more, and a gradation image portion progressively varied in tone level thereof along a predetermined direction,
the controller controls tone correction characteristics of the apparatus based on the densities of the gradation image portion, each of the densities of the gradation image portion is corrected based on the density of the corresponding sampling point in the solid image portion as to the circumferential length of the toner carrier
the image forming unit forms the tone-control patch image to overlap at least a part of an area of the image carrier surface carrying the density-control patch image during the control of the image density, and
the controller uses a sampling result of the overlapped portion free from toner image in the control of the image density and in the control of the tone correction characteristics.

4. An image forming apparatus comprising:
a toner carrier that carries a toner on its surface and rotates in a predetermined direction;
an image forming unit forming a toner image as a density-control patch image as varying a density control factor in multiple steps, the density control factor affecting image density; and
a controller determining an optimum value of the density control factor based on detected densities of the density-control patch image thereby controlling the image density, wherein
the image forming unit forms a toner image as a tone-control patch image as setting the density control factor to the optimum value determined by the controller based on the detected densities of the density-control patch image, the tone-control patch image including a solid image portion of a solid image having a length along a moving direction of the surface of the toner carrier, the length being a length corresponding to a circumferential length of the toner carrier or more, and a gradation image portion progressively varied in tone level thereof along a predetermined direction,
the controller controls tone correction characteristics of the apparatus based on the detected densities of the solid image portion and the gradation image portion,
the controller uses the detected density of the solid image portion as a density information piece corresponding to a maximum tone level, and the detected densities of the gradation image portion, each of the densities detected at plural points at mutually different locations in the gradation image portion and then corrected based on the detected density of the corresponding point as to the circumferential length of the toner carrier in the solid image portion, as density information pieces corresponding to individual tone levels thereof; determines gamma characteristics of the apparatus based on these density information pieces; and defines the tone correction characteristics in a manner to compensate for the gamma characteristics, the image forming unit forms the tone-control patch image in a manner that the solid image portion adjoins the gradation image portion along the predetermined direction, and the image forming unit forms the gradation image portion in a manner that out of opposite ends of the gradation image portion with respect to the predetermined direction, one end adjoining the solid image portion has a maximum tone level whereas another end thereof has a minimum tone level.

5. An image forming apparatus comprising:

an image forming unit forming a toner image as a patch image including a gradation image portion progressively increased or decreased in a tone level thereof along a predetermined direction;

a detector detecting an image density of a predetermined detection region of the patch image and outputting a signal corresponding to the detected density; and a controller sampling the signal outputted from the detector in correspondence to each of the plural detection regions located at mutually different positions along the predetermined direction; performing a predetermined moving average processing on the sampling results; and controlling tone correction characteristics of the apparatus based on the results of the moving average processing, wherein the moving average processing determines a mean value of the sampling results of individual detection regions included in the plural detection regions and in a process subject area extended along the predetermined direction, the image forming unit comprises a belt-like image carrier entrained about a plurality of rollers and rotated along the predetermined direction as carrying the patch image thereon, the detector is disposed in opposing relation with one confronting roller of the plural rollers for detecting a density of the patch image on the surface of the image carrier entrained about the confronting roller, the image forming unit forms the patch image having a length along the predetermined direction that is a circumferential length of the confronting roller or more, the controller performs the moving average processing on the process subject area, the length of which is defined as the circumferential length of the confronting roller, the image forming unit forms the toner image as the patch image which includes a header image portion adjoining at least one of opposite ends of the gradation image portion with respect to the predetermined direction and having a length along the predetermined direction which is ½ of a length of the process subject area or more, the image forming unit forms the patch image in a manner that a tone level is constant or continuously varied on the opposite sides of a boundary between the gradation image portion and the header image portion, and the image forming unit forms the toner image as the patch image in which the gradation image portion is varied in tone level thereof from a maximum level to a minimum level along the predetermined direction, and in which the header image portion adjoining a high-tone end of the gradation image portion has a tone of the maximum level.

* * * * *